(12) United States Patent
Miyazaki

(10) Patent No.: US 11,067,880 B2
(45) Date of Patent: Jul. 20, 2021

(54) LIGHT SOURCE UNIT AND PROJECTOR

(71) Applicant: CASIO COMPUTER CO., LTD, Tokyo (JP)

(72) Inventor: Takeshi Miyazaki, Fussa (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 82 days.

(21) Appl. No.: 16/150,054

(22) Filed: Oct. 2, 2018

(65) Prior Publication Data
US 2019/0101813 A1 Apr. 4, 2019

(30) Foreign Application Priority Data

Oct. 3, 2017 (JP) .............................. JP2017-193200
Dec. 21, 2017 (JP) .............................. JP2017-244592

(51) Int. Cl.
*G03B 21/20* (2006.01)
*G03B 33/08* (2006.01)
*G02B 26/00* (2006.01)

(52) U.S. Cl.
CPC ......... *G03B 21/204* (2013.01); *G03B 21/208* (2013.01); *G03B 21/2066* (2013.01); *G03B 33/08* (2013.01); *G02B 26/008* (2013.01)

(58) Field of Classification Search
CPC .... G03B 21/204; G03B 33/08; G03B 21/208; G03B 21/2066; G02B 26/008; G02B 26/0816

See application file for complete search history.

(56) References Cited

U.S. PATENT DOCUMENTS

| 2013/0050654 A1* | 2/2013 | Hu ........................ G03B 33/06 353/31 |
| 2014/0104611 A1* | 4/2014 | Watson ..................... G01J 3/06 356/326 |
| 2015/0267880 A1* | 9/2015 | Hadrath ................ F21V 7/0033 362/84 |

FOREIGN PATENT DOCUMENTS

| CN | 104820334 A | 8/2015 |
| JP | 2011-128522 A | 6/2011 |

(Continued)

OTHER PUBLICATIONS

Machine Translation JP6464781 B2 publication date of the JP patent (JP6464781B2 is a patent of JP patent application JP20150018367, which was published as JP2016142901 dated Aug. 8, 2016).*

(Continued)

*Primary Examiner* — Michelle M Iacoletti
*Assistant Examiner* — Danell L Owens
(74) *Attorney, Agent, or Firm* — Fitch, Even, Tabin & Flannery LLP

(57) ABSTRACT

A light source according to the present invention includes an excitation light source configured to emit excitation light, and a luminescent wheel including a base material, a fluorescent light emitting zone formed on one surface of the base material and configured to emit fluorescent light having a wavelength in a wavelength range which differs from that of the excitation light and a reflection zone disposed so as to be aligned with the fluorescent light emitting zone on the one side surface of the base material and configured to reflect the excitation light, and a shining position of the excitation light on the fluorescent light emitting zone and a shining position of the excitation light on the reflection zone differ from each other in relation to a radial direction of the luminescent wheel.

13 Claims, 13 Drawing Sheets

(56) References Cited

FOREIGN PATENT DOCUMENTS

| JP | 2016142901 A | * | 8/2016 |
|---|---|---|---|
| JP | 2016142901 A | | 8/2016 |
| WO | 2014196079 A1 | | 12/2014 |

OTHER PUBLICATIONS

JPO; Application No. 2017-244592; Notification of Reasons for Refusal dated Aug. 8, 2019.
CNIPA; Application No. 201811168234.1; Second Office Action dated May 12, 2021.

* cited by examiner

FIG.5A
FIG.5B
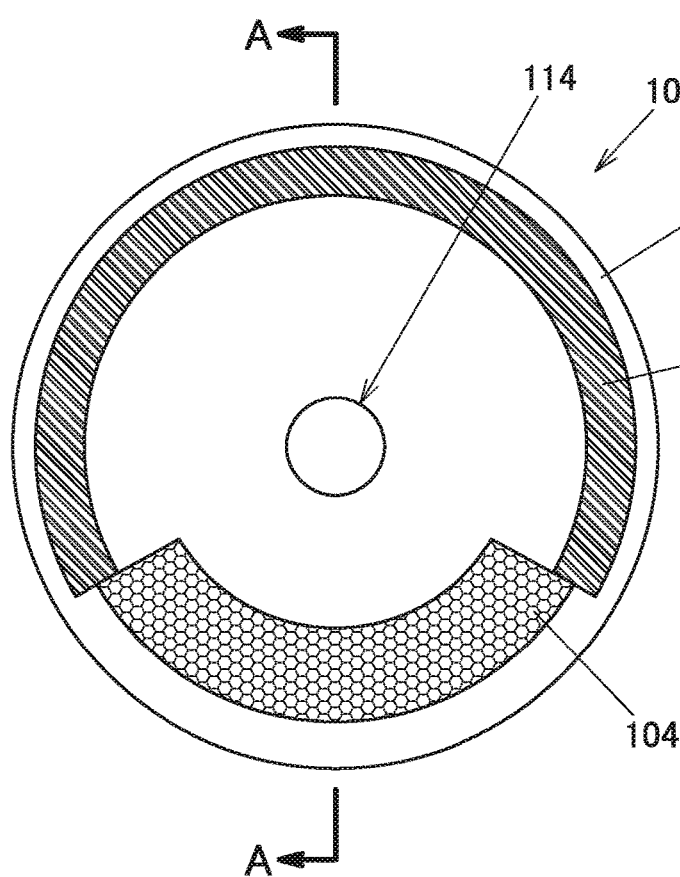
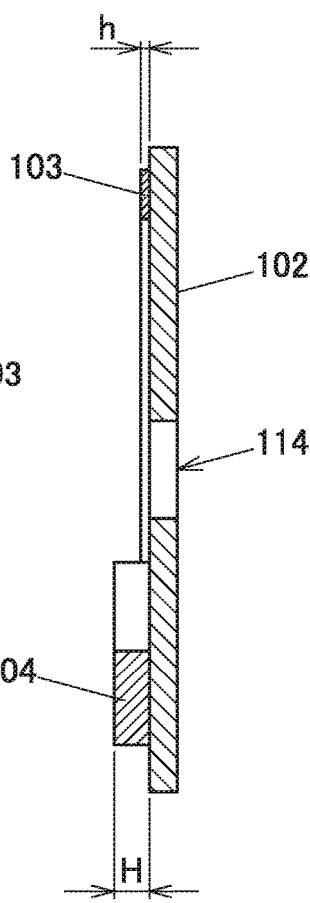

FIG.12A
FIG.12B
FIG.12C
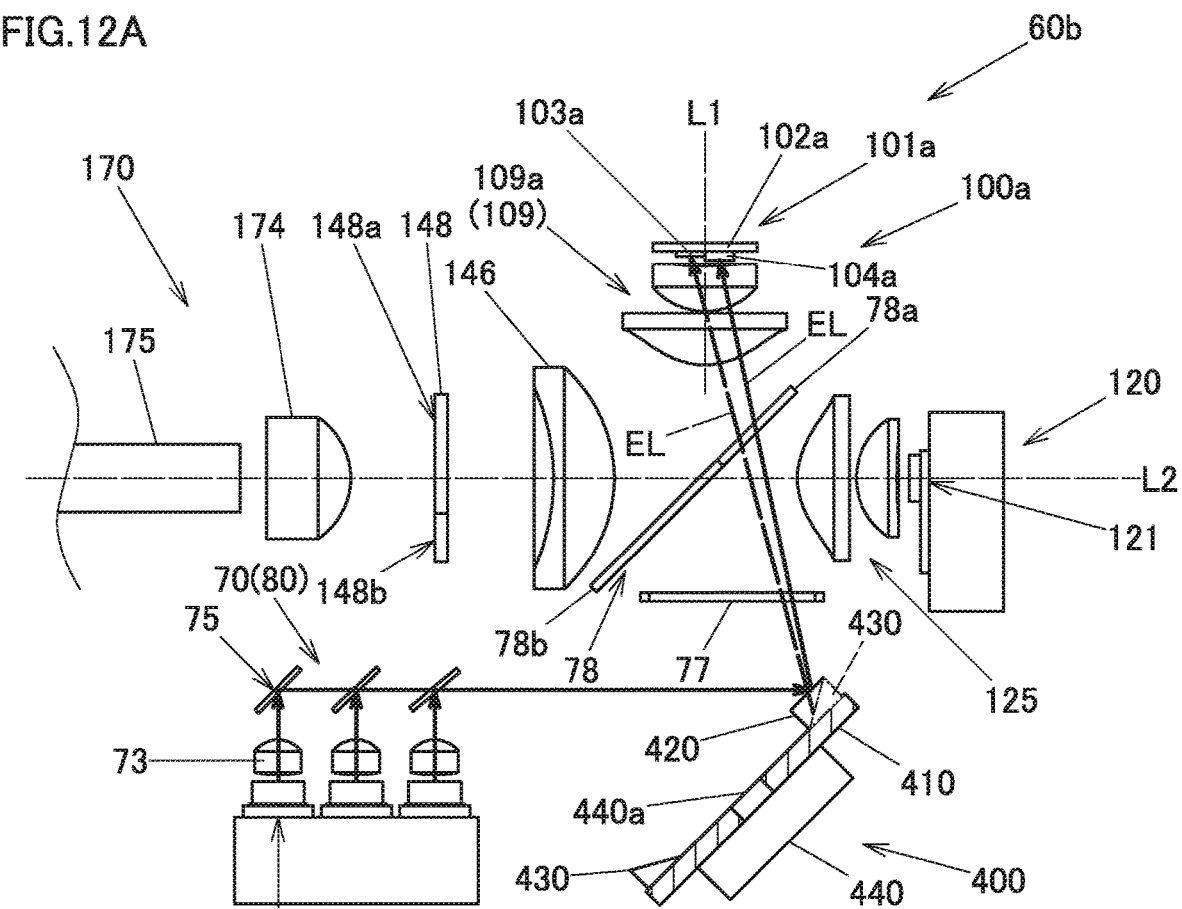
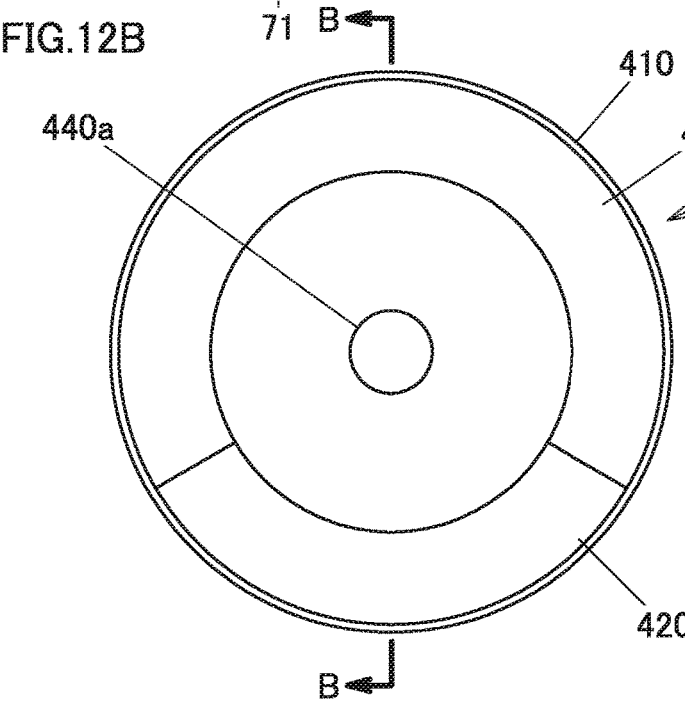
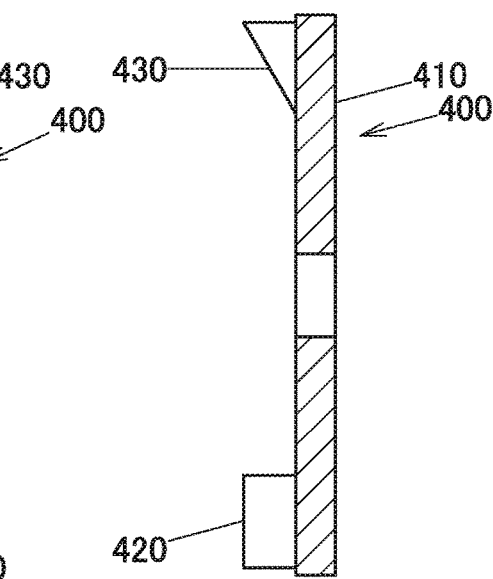

LIGHT SOURCE UNIT AND PROJECTOR

CROSS-REFERENCE TO RELATED APPLICATIONS

This application is based upon and claims the benefit of priority under 35 USC 119 from Japanese Patent Application No. 2017-193200 filed on Oct. 3, 2017 and Japanese Patent Application No. 2017-244592 filed on Dec. 21, 2017, the entire disclosures of which, including the descriptions, claims, drawings and abstracts, are incorporated herein by reference.

BACKGROUND OF THE INVENTION

Field of the Invention

The present invention relates to a light source unit and a projector including this light source unit.

Description of the Related Art

Data projectors are widely used on many occasions in these days as an image projection system for projecting an image of a screen of a personal computer or video player, as well as images created based on image data recorded on a memory card or the like. In these data projectors, light emitted from a light source is converted onto a micromirror display device called a digital micromirror device (DMD) or a liquid crystal panel to display a single full color image on a separate screen.

Conventionally, in the mainstream of these projectors, high-intensity discharge lamps have been used as a light source. In recent years, however, various types of projectors have been developed which use, as a light source, light emitting diodes, laser diodes, organic electroluminescence, or luminescent material.

A projector disclosed in Japanese Patent No. 5495023 includes an excitation light source, which is a blue light source, a luminescent wheel including a green light emitting zone configured to emit light having a wavelength in the green wavelength range or, to be simpler, light in the green wavelength range using excitation light from the excitation light source and a diffuse reflection zone configured to reflect excitation light from the excitation light source, a rotation controllable light cut-off wheel disposed on an optical path of light emitted from the luminescent wheel, and a red light source.

The light cut-off wheel of the projector disclosed in Japanese Patent No. 549502 has a light cut-off zone configured to cut off blue light emitted together with fluorescent light from the luminescent wheel and a light transmitting zone. With this projector installing the light cut-off wheel, there is caused a problem in that the light source unit and hence the projector itself is enlarged in size due to the provision of the light cut-off wheel.

SUMMARY OF THE INVENTION

The present invention has been made in view of the situations described above, and an object thereof is to provide a light source unit configured to reduce the overall size of the light source unit and a projector including this light source unit.

According to an aspect of the invention, there is provided a light source unit including an excitation light source configured to emit excitation light and a luminescent wheel including a base material, a fluorescent light emitting zone formed on one surface of the base material and configured to emit fluorescent light having a wavelength in a wavelength range which differs from that of the excitation light and a reflection zone disposed so as to be aligned with the fluorescent light emitting zone on the one surface of the base material and configured to reflect the excitation light, wherein a shining position of the excitation light on the fluorescent light emitting zone and a shining position of the excitation light on the reflection zone differ from each other in relation to a radial direction of the luminescent wheel.

According to another aspect of the invention, there is provided a projector including a light source unit including an excitation light source configured to emit excitation light and a luminescent wheel including a base material, a fluorescent light emitting zone formed on one surface of the base material and configured to emit fluorescent light having a wavelength in a wavelength range which differs from that of the excitation light and a reflection zone disposed so as to be aligned with the fluorescent light emitting zone on the one surface of the base material and configured to reflect the excitation light, wherein a shining position of the excitation light on the fluorescent light emitting zone and a shining position of the excitation light on the reflection zone differ from each other in relation to a radial direction of the luminescent wheel, a display device onto which light source light from the light source unit is shone to form image light, a projection optical system configured to project the image light emitted from the display device onto a screen, and a projector control unit configured to control the display device and the light source unit.

According to a further aspect of the invention, there is provided a projector including, a light source unit including an excitation light source configured to emit excitation light and a luminescent wheel including a base material, a fluorescent light emitting zone formed on one surface of the base material and configured to emit fluorescent light having a wavelength in a wavelength range which differs from that of the excitation light and a reflection zone disposed so as to be aligned with the fluorescent light emitting zone on the one surface of the base material and configured to reflect the excitation light, wherein a shining position of the excitation light on the fluorescent light emitting zone and a shining position of the excitation light on the reflection zone differ from each other in relation to a radial direction of the luminescent wheel, and wherein a height from the one side surface of the base material to a surface of the fluorescent light emitting zone differs from a height from the one side surface of the base material to a surface of the reflection zone, a display device onto which light source light from the light source unit is shone to form image light, a projection optical system configured to project the image light emitted from the display device onto a screen, and a projector control unit configured to control the display device and the light source unit.

BRIEF DESCRIPTION OF THE SEVERAL VIEWS OF THE DRAWINGS

FIG. 5A is a schematic front view illustrating a luminescent plate of the light source unit according to the first embodiment of the invention, FIG. 5B is a schematic sectional view taken along a line A-A in FIG. 5A and illustrating the luminescent plate of the light source according to the first embodiment of the invention, FIG. 12A is a schematic plan view of a light source unit according to a third embodiment of the invention, illustrating a state in which excitation light is shone onto a fluorescent light emitting zone, FIG. 12B is a schematic front view of a luminescent plate of the light source unit according to the third embodiment of the invention, FIG. 12C is a schematic sectional view of the luminescent plate of the light source unit according to the third embodiment of the invention, taken along a line B-B in FIG. 12B.

DETAILED DESCRIPTION OF THE PREFERRED EMBODIMENTS

First Embodiment

Figure 1:
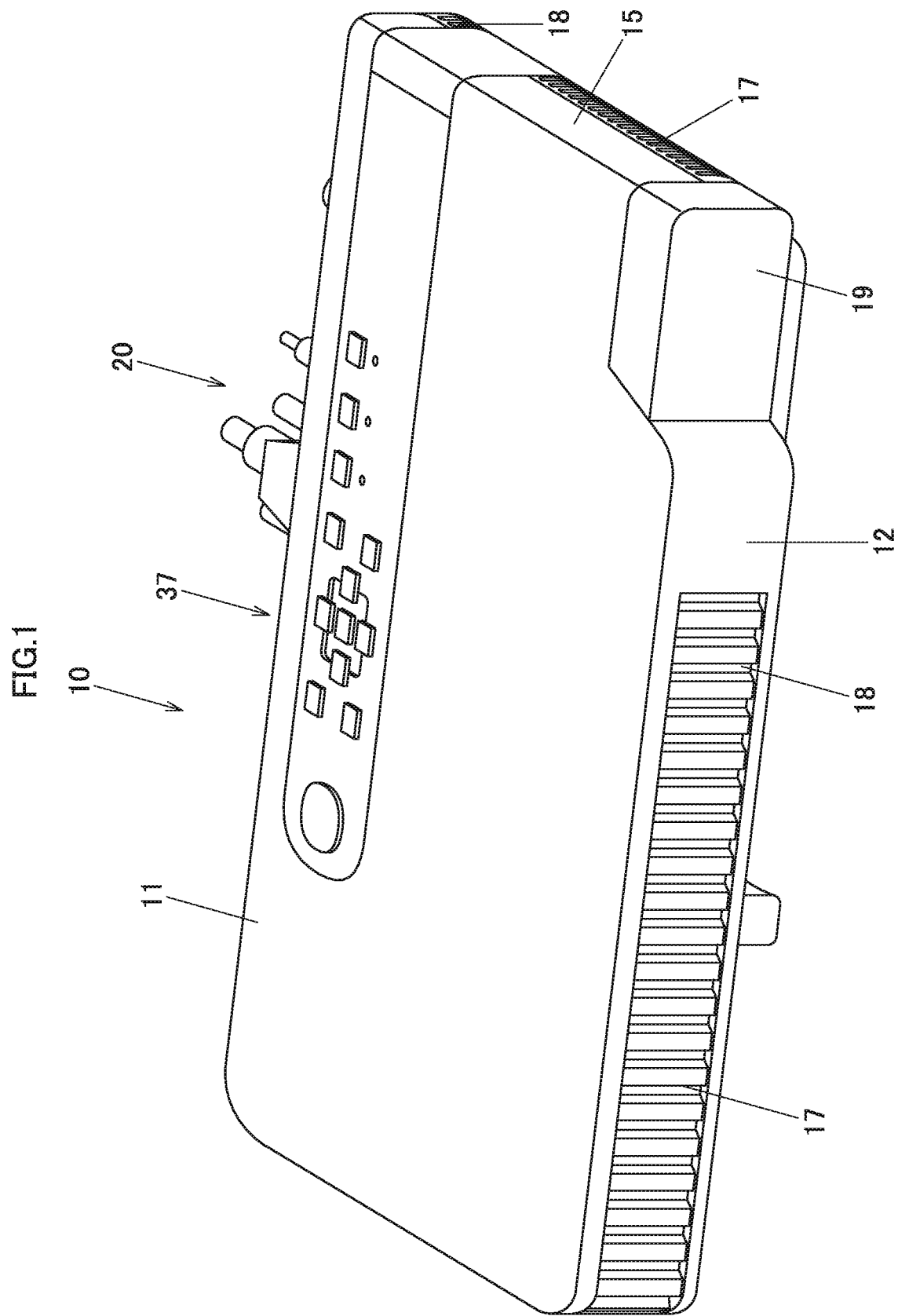
FIG. 1 is an external perspective view of a projector according to a first embodiment of the invention.

Hereinafter, a mode for carrying out the invention will be described. FIG. 1 is an external perspective view of a projector 10 according to a first embodiment of the invention. In the first embodiment of the invention, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

The projector 10 has a substantially rectangular parallelepiped shape as illustrated in FIG. 1. The projector 10 has a lens cover 19 that covers a projection port to a side of a front panel 12, which is a front side panel of a casing of the projector 10. Pluralities of outside air inlet holes 18 and inside air outlet holes 17 are provided in the front panel 12. Further, although not illustrated, the projector 10 includes an Ir reception unit configured to receive a control signal from a remote controller.

A keys/indicators unit 37 is provided on an upper panel 11 of the casing. Disposed on this keys/indicators unit 37 are keys and indicators including a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display device, a control unit or the like when they really overheat.

Further, an input/output connector unit including a USB terminal, a video signal input D-SUB terminal, an S terminal, an RCA terminal and the like and various types of terminals 20 such as a power supply adaptor plug and the like are provided on a back panel of the casing. Outside air inlet holes are formed in the back panel. Additionally, inside air outlet holes 17 are formed in each of a right panel, which is a side panel of the casing and is not illustrated in FIG. 1, and a left panel 15, which is also a side panel of the casing and is illustrated in FIG. 1. Further, outside air inlet holes 18 are formed in a corner portion of the left panel 15 that lies in the vicinity of the back panel.

Figure 2:
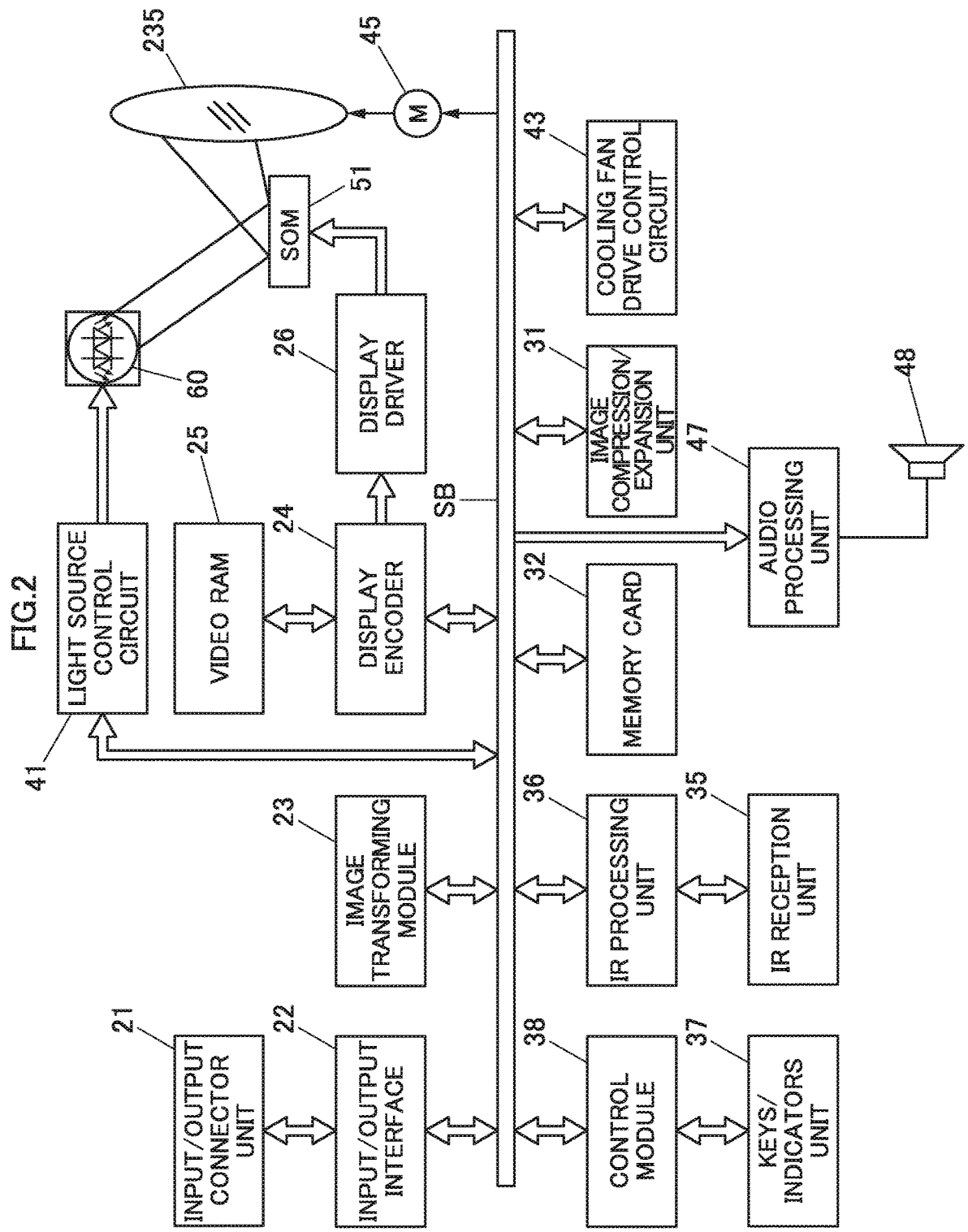
FIG. 2 is a block diagram illustrating functional circuit blocks of the projector according to the first embodiment of the invention.

Next, a projector control unit of the projector 10 will be described by the use of a functional circuit block diagram illustrated in FIG. 2. The projector control unit includes a control module 38, an input/output interface 22, an image transforming module 23, a display encoder 24, a display driver 26 and the like. Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the unified image signal is outputted to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 functions as a display device controller. The display driver 26 drives a display device 51, which is a spatial optical modulator (SOM), at an appropriate frame rate in response to the image signal outputted from the display encoder 24. The projector 10 shines a pencil of light emitted from a light source unit 60 onto the display device 51 by way of a light guiding optical system, whereby an optical image is formed by using reflected light reflected by the display device 51. The image so formed is then projected onto a screen, not illustrated, for display on it by way of a projection optical system, which will be described later. A movable lens group 235 of the projection optical system is driven by a lens motor 45 for zooming and focusing.

An image compression/expansion unit 31 performs a recording operation in which a luminance signal and a color difference signal of an image signal are data compressed through ADCT and Huffman coding processes, and the compressed data is sequentially written on a memory card 32, which takes a form of a detachable recording medium. With the projector 10 set in a reproducing mode, the image compression/expansion unit 31 reads out the image data recorded on the memory card 32 and expands the individual image data that make up a series of dynamic images frame by frame. Then, the image compression/expansion unit 31 outputs the image data to the display encoder 24 by way of the image transforming module 23 so as to enable the display of dynamic images based on the image data stored on the memory card 32.

The control module 38 governs the control of respective operations of circuitries within the projector 10 and is made up of a CPU, a ROM that stores operation programs of various types of settings in a fixed fashion, a RAM that is used as a working memory and the like.

Operation signals generated at the keys/indicators unit 37 that includes the main keys and indicators which are provided on the upper panel 11 are sent out directly to the control module 38. Key operation signals from the remote controller are received by the IR reception unit 35 and are then demodulated into a code signal at an IR processing unit 36 for output to the control module 38.

The control module 38 is connected to an audio processing unit 47 by way of the system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The control module 38 controls a light source control circuit 41, which is configured as a light source control module. The light source control circuit 41 controls an excitation light source and a red light source device to emit light having a wavelength in the red wavelength range, light in the red wavelength range, light having a wavelength in the green wavelength range and light having a wavelength in the blue wavelength range at predetermined timings so that light having a wavelength in a predetermined wavelength range required in forming an image is emitted from the light source unit 60.

Further, the control module 38 causes a cooling fan drive control circuit 43 to detect temperatures through a plurality of temperature sensors which are provided in the light source unit 60 so as to control the revolution speeds of cooling fans based on the results of the temperature detections. Additionally, the control module 38 also causes the cooling fan drive control circuit 43 to keep the cooling fans rotating by use of a timer or the like even after the power supply to a main body of the projector 10 is switched off. Alternatively, the control module 38 causes the cooling fan drive control circuit 43 to cut off the power supply to the main body of the projector 10 depending upon the results of the temperature detections by the temperature sensors.

Figure 3:
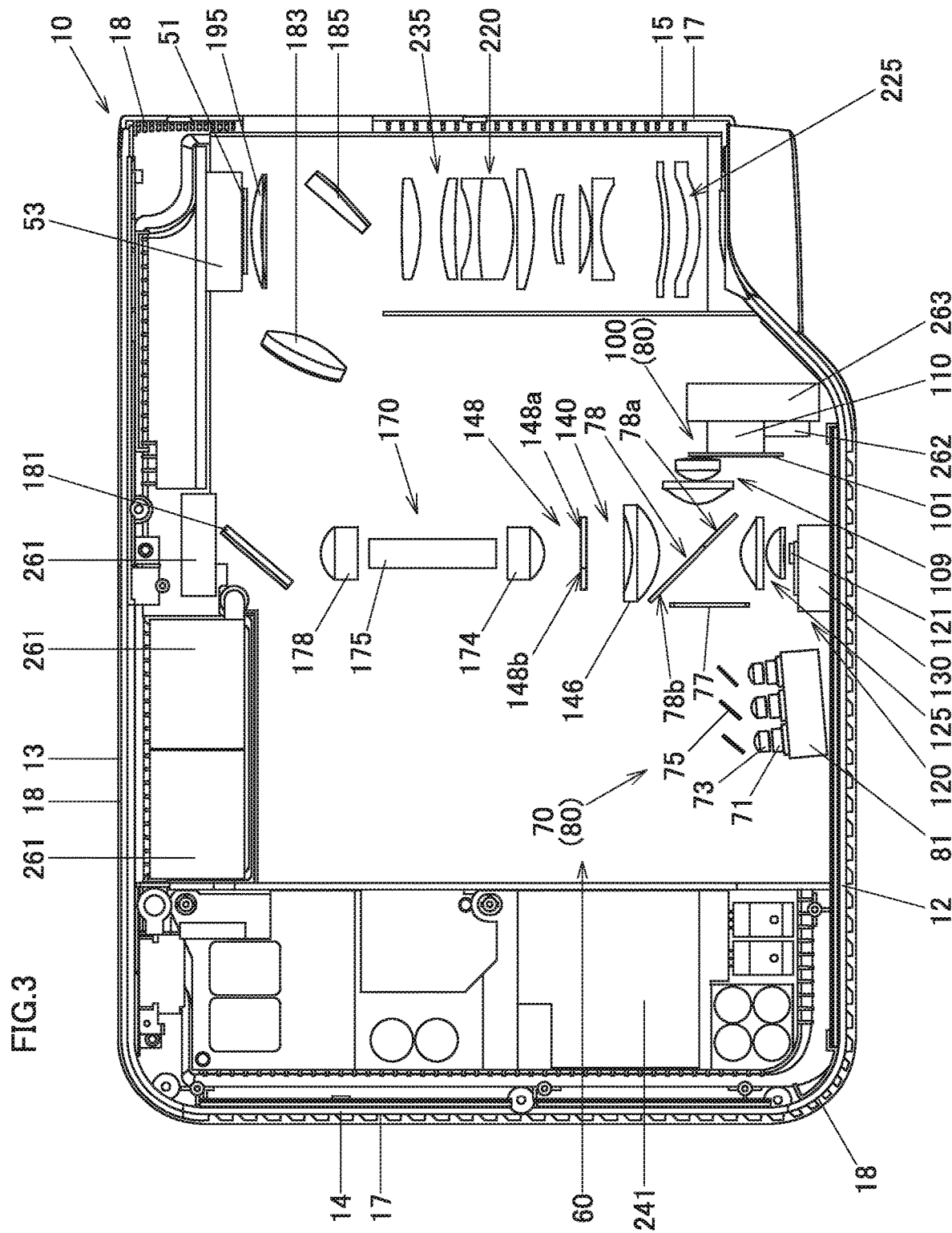
FIG. 3 is a schematic plan view illustrating an internal structure of the projector according to the first embodiment of the invention.

FIG. 3 is a schematic plan view illustrating an internal structure of the projector 10. The projector 10 includes a control circuit board 241 near a right panel 14. This control circuit board 241 includes a power supply circuit block and a light source control block. In addition, the projector 10 includes the light source unit 60 at a substantially central portion of the casing of the projector 10. Further, the projector 10 includes a light source side optical system 170 disposed between the light source unit 60 and a back panel 13 and a projection optical system 220 disposed between the light source unit 60 and the left panel 15.

The light source unit 60 includes an excitation light shining device 70 functioning as a blue light source device configured to emit light having a wavelength in the blue wavelength range (excitation light) and an excitation light source, a green light source device 80 functioning as a light source configured to emit light having a wavelength in the green wavelength range (fluorescent light), and a red light source device 120 functioning as a light source configured to emit light having a wavelength in the red wavelength range (light having a wavelength in a third wavelength range). The green light source device 80 is made up of the excitation light shining device 70 and a luminescent plate device 100. Then, a light guiding optical system 140 is disposed in the light source unit 60. This light guiding optical system 140 guides and emits light having a wavelength in the red, green and blue wavelength ranges. The light guiding optical system 140 guides light having a wavelength in the red wavelength range, light having a wavelength in the green wavelength range and light having wavelength in the blue wavelength range which are emitted, respectively, from the corresponding light source devices 70, 80, 120 to the light source side optical system 170.

The excitation light shining device 70 is disposed in a position in the casing of the projector 10 which is situated substantially at a center in relation to a left-and-right direction and near the front panel 12. The excitation light shining device 70 includes three semiconductor light emitting devices, that is, blue laser diodes 71 (excitation light sources) disposed so as to emit light having a wavelength in the blue wavelength range in the direction of the back panel 13. Collimator lenses 73 and reflecting mirrors 75 are provided on optical axes of these blue laser diodes 71. The collimator lenses 73 convert light emitted from the corresponding blue laser diodes 71 into parallel light so as to enhance the directivity of the emitted light. The reflecting mirrors 75 turn axes of beams of light emitted from the blue laser diodes 71 through 90 degrees to reflect them in the direction of the left panel 15. A diffuse plate 77 is provided to a side of the reflecting mirrors 75 to which light reflected by the reflecting mirrors 75 travels. This diffuse plate 77 diffuses light having a wavelength in the blue wavelength range.

Figure 4A:
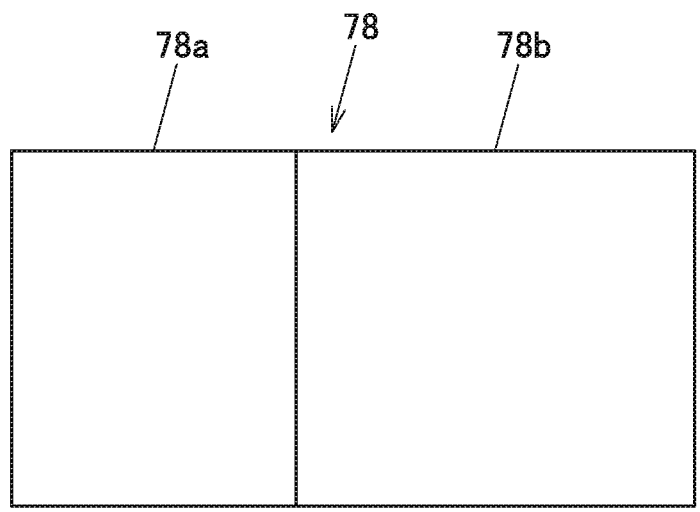
FIG. 4A is a schematic front view illustrating a first divided dichroic mirror of divided dichroic mirrors of a light source unit according to the first embodiment of the invention.

A first divided dichroic mirror 78 is provided on a light emerging side of the diffuse plate 77, and this first divided dichroic mirror 78 is formed into a substantially rectangular flat plate. The first divided dichroic mirror 78 is disposed to form an angle of 45 degrees with respect to an optical axis of a collective lens group 125 of the red light source device 120 and an optical axis of a collective lens group 109 of the luminescent plate device 100. As illustrated in FIG. 4A, too, the first divided dichroic mirror 78 is made up of two zones (a first zone 78a, a second zone 78b) having different spectral characteristics. The first zone 78a transmits light having a wavelength in the blue wavelength range and light having a wavelength in the red wavelength range and reflects light having a wavelength in the green wavelength range. The second zone 78b transmits light having a wavelength in the red wavelength range and reflects light having a wavelength in the blue wavelength range and light having a wavelength in the green wavelength range. The first zone 78a is formed to have a smaller area than that of the second zone 78b.

A heat sink 81 is disposed on a rear side of the blue laser diodes 71. On the other hand, a cooling fan 261 is disposed near the back panel 13. The blue laser diodes 71 are cooled by the heat sink 81 and the cooling fan 261.

The luminescent plate device 100 includes a luminescent plate 101 and a wheel motor 110. The luminescent plate 101 takes the form of a luminescent wheel and is disposed parallel to the left panel 15. The wheel motor 110 drives and rotates the luminescent plate. A heat sink 262 is disposed near the wheel motor 110, and a cooling fan 263 is disposed between the wheel motor 110 and the front panel 12. The luminescent plate device 110 is cooled by the heat sink 262 and the cooling fan 263.

The luminescent plate 101 is formed into a circular disc as illustrated in FIG. 5A. A base material 102 of the luminescent plate 101 is a metallic base material of copper or aluminum. The base material 102 is fixed to a motor shaft 114 of the wheel motor 110. A front flat surface of the base material 102 is mirror finished through silver deposition. A fluorescent light emitting zone 103 (a fluorescent light emitting zone) is a zone from which fluorescent light is emitted, and an annular layer of a green luminescent material is laid out on the mirror finished surface. A diffuse reflection zone 104 is made up of a reflecting member and a diffuse transmission portion. The reflecting member is made of metal or the like and is formed on the surface of the base material 102 or in a through hole portion formed by cutting away a part of the base material 102. The diffuse transmission portion is formed on the reflecting member. The diffuse reflection zone 104 is made by forming a diffuse reflecting member of, for example, glass on which a reflecting coat is applied by forming minute irregularities on a surface of it through sandblasting. Specifically, a reflecting coat (for example, a metallic coat of aluminum or silver) is deposited on a glass diffusing surface which is given a predetermined diffusing angle, whereby a glossy diffuse reflecting surface can be formed. In this way, the fluorescent light emitting zone 103 and the diffuse reflection zone 104 are disposed so as to be aligned with each other in a circumferential direction.

The diffuse reflection zone 104 may not be made up of the reflecting member and the diffuse transmission portion. Although not illustrated, for example, irregularities are formed on a surface of a mold or a die (a casting mold or a pressing die) used for molding or pressing a metal of copper or aluminum, and the irregularities are transferred onto a metallic base material to emboss it. Then, a diffuse transmission portion may be formed on projecting portions of the embossed metallic base material. When embossing the metallic base material to form irregularities on the surface of it, a chemical corrosion (chemical etching) process may be adopted in which a surface of a metal is dissolved chemically to emboss it. In this way, projecting portions of a predetermined height are formed on a metallic base plate, and diffuse transmission portions are formed on the projecting portions, whereby a distance between the base material 102 and the diffuse transmission portion can be ensured longer than a distance between the base material 102 and the fluorescent light emitting zone 103 without forming the diffuse transmission portion on the reflecting member of a predetermined thickness.

As illustrated in FIG. 5B, in the luminescent plate 101, a height H of the diffuse reflection zone 104 from the base material 102 is higher than a height h of the fluorescent light emitting zone 103 from the base material 102. For example, when assuming that the fluorescent light emitting zone 103 has a height of about 0.1 mm, then, the diffuse reflection zone 104 can be given a height ranging from 0.3 to 0.4 mm.

When light having a wavelength in the blue wavelength range which travels from the excitation light shining device 70 as excitation light is shone onto to the green luminescent material layer of the fluorescent light emitting zone 103, the green luminescent material is excited, whereby light having a wavelength in the green wavelength range is emitted in every direction from the green luminescent material. Pencils of fluorescent light that are emitted in every direction are then shone directly or after reflected on the mirror finished surface of the base material 102 onto a front surface side of the luminescent plate 101 (in other words, towards the right panel 14) to be incident on the collective lens group 109 made up of a combination of collective lenses. Similarly, light having a wavelength in the blue wavelength range which travels from the excitation light shining device 70 is incident on the diffuse reflection zone 104 to be reflected while being diffused towards the front surface side of the luminescent plate 101 and is then incident on the collective lens group 109. The collective lens group 109 collects pencils of excitation light emitted from the excitation light shining device 70 to the luminescent plate 101 and also collects pencils of light emitted from the luminescent plate towards the right panel 14. Thus, light having a wavelength in the green wavelength range and light having a wavelength in the blue wavelength range which are emitted from the luminescent plate 101 are incident on the first divided dichroic mirror 78 by way of the collective lens group 109.

The red light source device 120 is disposed so that light emitted from the red light source device 120 intersects light having a wavelength in the blue wavelength range which is reflected by the reflecting mirrors 75 of the excitation light shining device 70. Additionally, the first divided dichroic mirror 78 is provided in a position where light having a wavelength in the red wavelength range which is emitted from the red light source device 120 intersects light having a wavelength in the blue wavelength range which is incident on and reflected, while being diffused, onto the luminescent plate 101 and light having a wavelength in the green wavelength range which is emitted from the luminescent plate 101.

The red light source device 120 includes a red light source 121 (a third light source) and a collective lens group 125. The red light source 121 is disposed so as to emit light in the direction of the back panel 13. The collective lens group 125 collects light emitted from the red light source 121. The red light source 121 is a red light emitting diode which is a semiconductor light emitting device configured to emit light having a wavelength in the red wavelength range. Further, the red light source device 120 is cooled by a heat sink 130 disposed at a side of the red light source 121 which faces the front panel 12.

The light guiding optical system 140 is provided on a side of the first divided dichroic mirror 78 which faces the back panel 13. Light having a wavelength in the blue wavelength range, light having a wavelength in the green wavelength range and light having a wavelength in the red wavelength range, which are emitted, respectively, from the blue, green and red light source devices 70, 80, 120, are incident on a collective lens 146 of the light guiding optical system 140 by way of the first divided dichroic mirror 78.

Figure 4B:
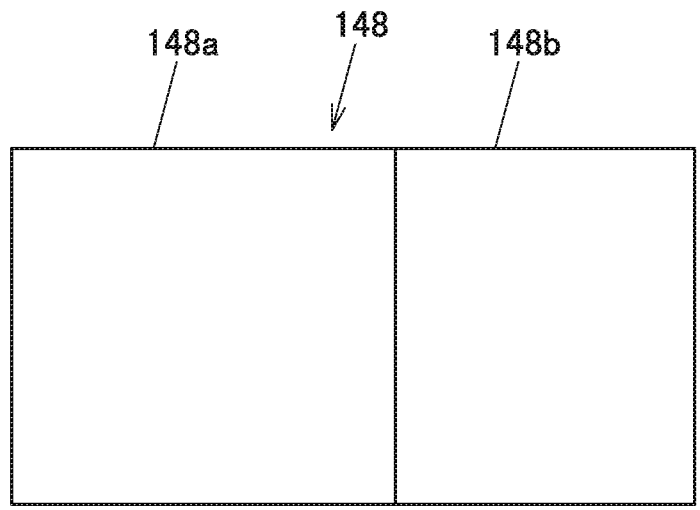
FIG. 4B is a schematic front view of a second divided dichroic mirror of the divided dichroic mirrors of the light source unit according to the first embodiment of the invention.

The light guiding optical system 140 is configured to guide light having a wavelength in the blue, green and red wavelength ranges in such a way that axes of these blue, green and red light beams are converged into the same single axis. This light guiding optical system 140 includes the collective lens 146 and a second divided dichroic mirror 148. The collective lens 146 is disposed on the side of the first divided dichroic mirror 78 which faces the back panel 13. The second divided dichroic mirror 148 is formed into a substantially rectangular flat plate and is disposed on a side of the collective lens 146 which faces the back panel 13. The second divided dichroic mirror 148 is disposed at right angles to an optical axis L2 of the collective lens 146 (refer to FIG. 6 or 7). As illustrated in FIG. 4B, too, the second divided dichroic mirror 148 includes two zones (a third zone 148a, a fourth zone 148b) having different spectral characteristics. The third zone 148a transmits light having a wavelength in the red wavelength range and light having a wavelength in the green wavelength range and reflects light having a wavelength in the blue wavelength range. The fourth zone 148b transmits light. That is, the fourth zone 148b transmits any of light having a wavelength in the red, green and blue wavelength ranges. The third zone 148a is formed to have a larger area than that of the fourth zone 148b.

Although the second divided dichroic mirror 148 is disposed at right angles to the optical axis of the collective lens 146, the invention is not limited to this configuration. Thus, the second divided dichroic mirror 148 can also be disposed so as to form an angle of 45 degrees with respect to the optical axis of the collective lens 146. As this occurs, although the efficiency with which residual excitation light EL1 contained in light having a wavelength in the green wavelength range, which will be described later, is reduced, a layout can be adopted in which light is caused to travel towards the second divided dichroic mirror 148 from a direction which is at right angles to the optical axis of the collective lens 146.

The light source side optical system 170 includes a collective lens 174, a light tunnel 175, a collective lens 178, a light axis turning mirror 181, a collective lens 183, a shining mirror 185, and a condenser lens 195. The condenser lens 195 emits image light which is emitted from the display device 51 disposed on a side of the condenser lens 195 which faces the back panel 13 towards a fixed lens group 225 and the movable lens group 235, and hence, the condenser lens 195 is also referred to as constituting part of the projection optical system 220.

The light having a wavelength in the red, green and blue wavelength ranges which is collected by the collective lens 146 is allowed to travel from the collective lens 174 to the light tunnel 175 after having passed through the second divided dichroic mirror 148. The intensity of the pencil of light having a wavelength in the red, green and blue wavelength ranges which has entered the light tunnel 175 is more uniformly distributed. Note that a microlens array can also be used in place of the light tunnel 175.

The light axis turning mirror 181 is disposed on an optical axis of the light tunnel 175 which is directed towards the back panel 13 from an end of the light tunnel 175 which faces the back panel 13 with the collective lens 178 interposed between them. The pencil of light emerging from an emerging port of the light tunnel 175 is collected at the collective lens 178 and is thereafter turned towards the left panel 15 by the light axis turning mirror 181.

The pencil of light reflected by the light axis turning mirror 181 is incident on the collective lens 183 to be collected and is then shone onto the display device 51 at a predetermined angle via the condenser lens 195 by the shining mirror 185. A heat sink 53 is provided on the back panel 13 side of the display device 51, which is a Digital Micormirror Device (DMD), whereby the display device 51 is cooled by the heat sink 53.

The pencil of light, which is light source light shone onto an image forming plane of the display device 51 by the light source side optical system 170, is then reflected on the image forming plane of the display device 51 and is then projected onto a screen by way of the projection optical system 220 as projected light. Here, the projection optical system 220 includes the condenser lens 195, the movable lens group 235 and the fixed lens group 225. The fixed lens group 225 is installed in a fixed lens barrel. The movable lens group 235 is installed in a movable lens barrel and is caused to move for zooming and focusing by the lens motor.

In the projector 10 configured as described heretofore, when the luminescent plate 101 is rotated, and the excitation light shining device 70 and the red light source device 120 emit light having wavelength in the blue and red wavelength ranges at different timings, the light having a wavelength in the red wavelength range, light having a wavelength in the green wavelength range and the light having a wavelength in the blue wavelength range are incident sequentially on the collective lens 174 and the light tunnel 175 by way of the light guiding optical system 140 and are further incident on the display device 51 by way of the light source side optical system 170. Then, the display device 51, which is the DMD, displays the light having a wavelength in the red, green and blue wavelength ranges in a time-sharing fashion according to data, whereby a single full-color image can be projected onto the screen.

Here, how light having a wavelength in the blue, green and red wavelength ranges which is emitted from the blue, green and red light source devices 70, 80, 120 is guided to the collective lens 174 of the light guiding optical system 140 will be described in detail. Light having a wavelength in the red wavelength range which is emitted from the red light source device 120 passes through the first zone 78a and the second zone 78b of the first divided dichroic mirror 78 by way of the collective lens group 125 and is collected by the collective lens 146. The light having a wavelength in the red wavelength range which emerges from the collective lens 146 passes through the third zone 148a and the fourth zone 148b of the second divided dichroic mirror 148 and is then collected by the collective lens 174.

Figure 6:
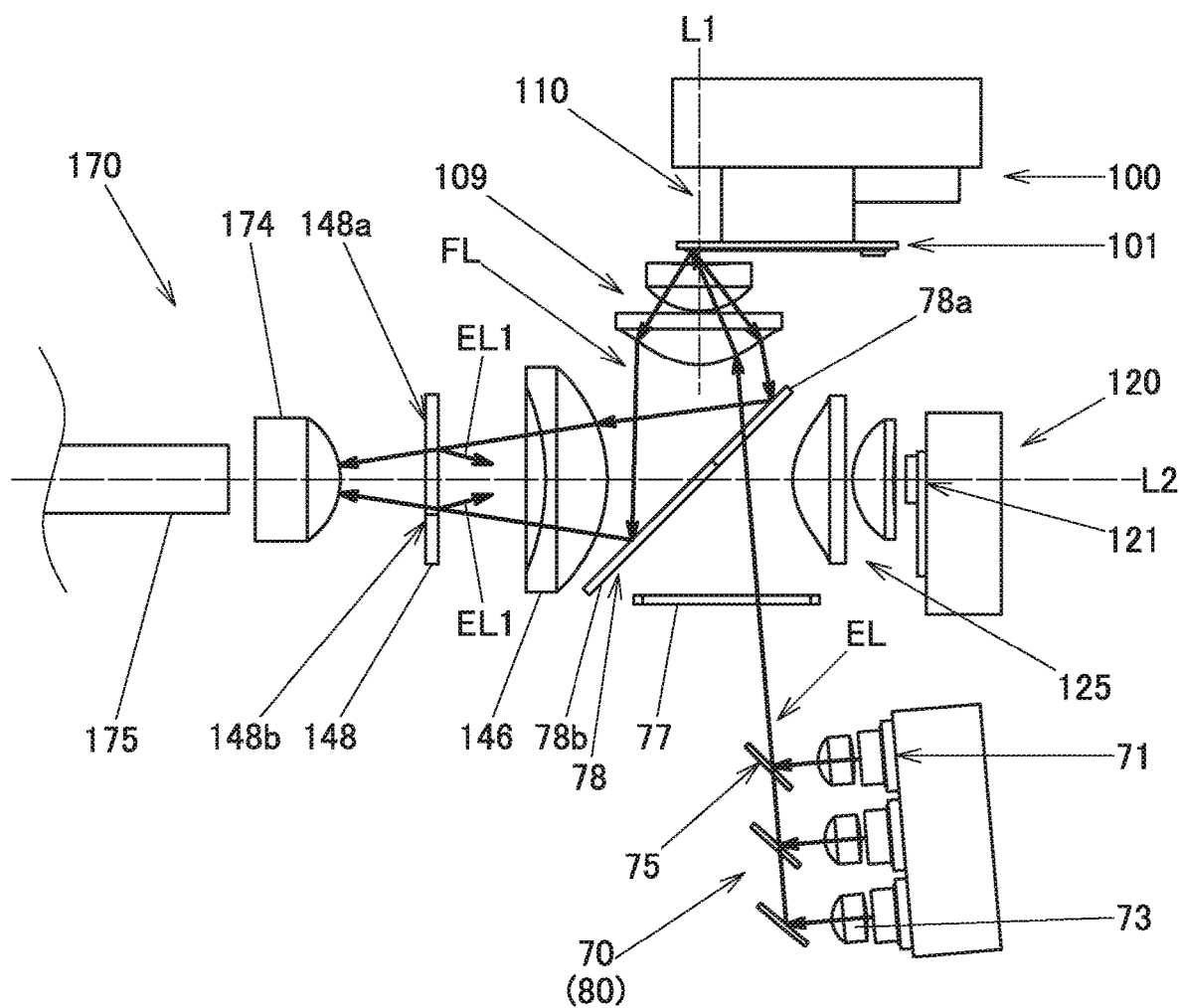
FIG. 6 is an enlarged schematic plan of the light source unit according to the first embodiment of the invention, illustrating a state in which light having a wavelength in the green wavelength range is emitted.
Figure 7:
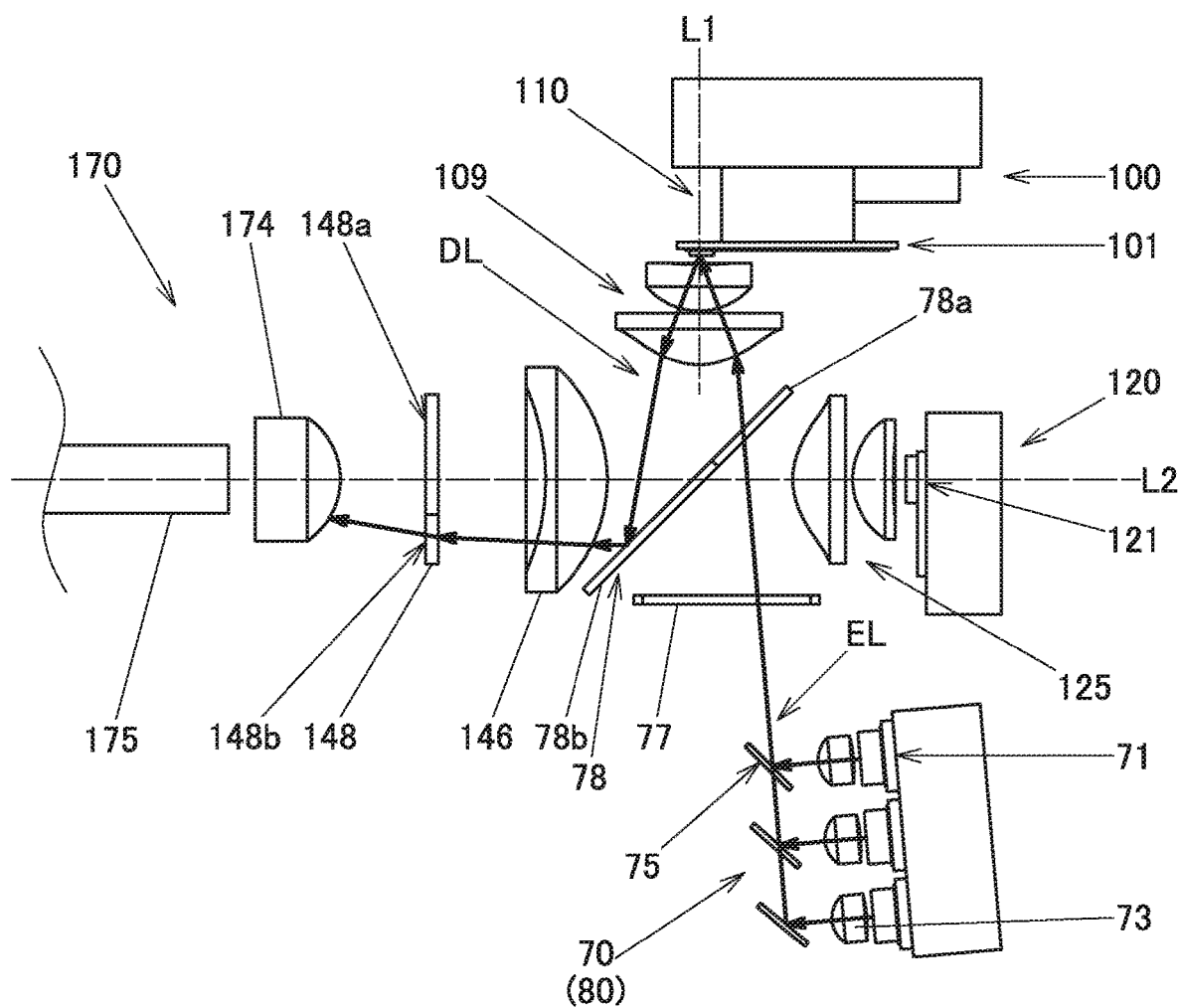
FIG. 7 is an enlarged schematic plan of the light source unit according to the first embodiment of the invention, illustrating a state in which light having a wavelength in the blue wavelength range is emitted.

As illustrated in FIGS. 6 and 7, when light having a wavelength in the blue wavelength range which travels from the collimator lens 73 is emitted from the reflecting mirror 75 of the excitation light shining device 70, an axis of the light having a wavelength in the blue wavelength range is inclined at a predetermined angle with respect to an optical axis of the collective lens group 109 of the luminescent plate device 100. Consequently, the light having a wavelength in the blue wavelength range which is emitted from the reflecting mirror 75 of the excitation light shining device 70 comes to face or match the first zone 78a of the first divided dichroic mirror 78 and is then incident on the first zone 78a, passing through the first zone 78a. The light having a wavelength in the blue wavelength range which is emitted from the first zone 78a of the first divided dichroic mirror 78 is incident on the collective lens group 109 of the luminescent plate device 100 from an oblique direction at the predetermined angle with respect to the optical axis of the collective lens group 109 of the luminescent plate device 100.

Figure 8A:
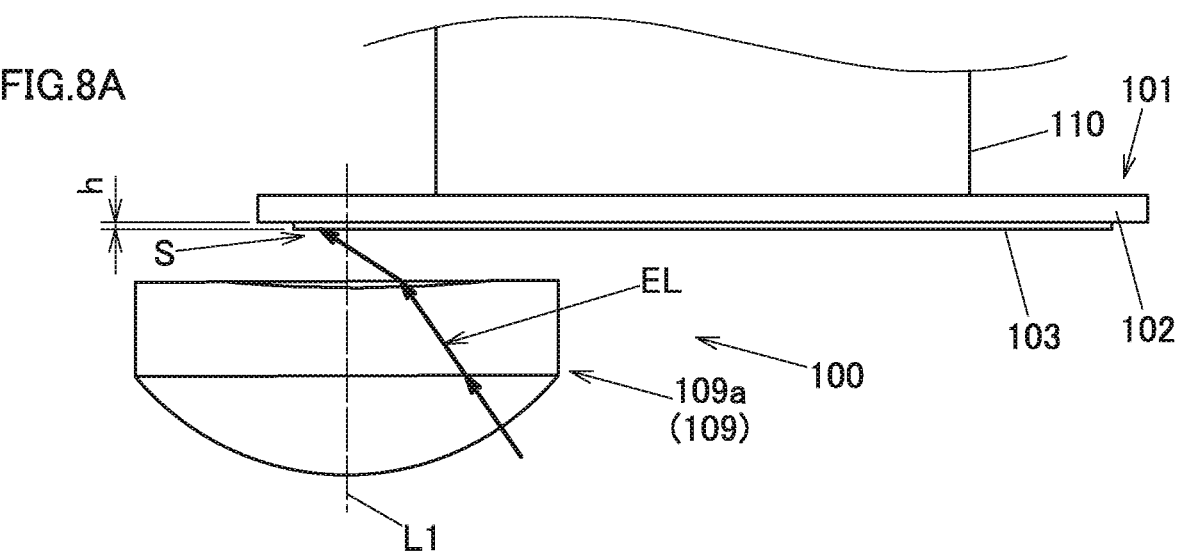
FIG. 8A is an enlarged schematic plan view of the periphery of a light shining spot of a luminescent plate device according to the first embodiment of the invention, illustrating a state in which light having a wavelength in the blue wavelength range is shone onto a fluorescent light emitting zone.
Figure 8B:
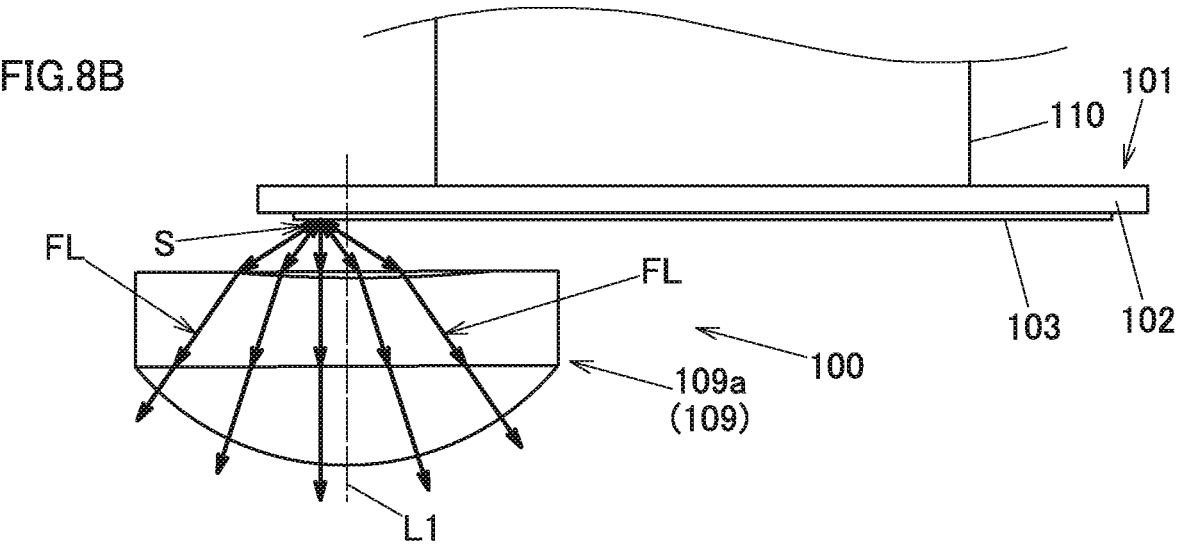
FIG. 8B is an enlarged schematic plan view of the periphery of a light shining spot of the luminescent plate device according to the first embodiment of the invention, illustrating a state in which fluorescent light is emitted from the fluorescent light emitting device.

When the green light source device 80 emits light having a wavelength in the green wavelength range, as illustrated in FIGS. 6, 8A and 8B, the fluorescent light emitting zone 103 of the luminescent plate 101 is positioned in a position matching a collective lens 109a of the collective lens group 109 which lies closest to the luminescent plate 101. As illustrated in FIG. 8A, excitation light EL, which is light having a wavelength in the blue wavelength range which is emitted from the collective lens 109a, is collected or converged to a shining spot S on the fluorescent light emitting zone 103. As this occurs, the shining spot S on the fluorescent light emitting zone 103 is formed to deviate radially outwards of the luminescent plate 101 from an optical axis L1 of the collective lens 109a (the collective lens group 109). However, in the case where the excitation light EL is shone onto the shining spot S on the fluorescent light emitting zone 103 without providing the collective lens 109a (the collective lens group 109), an incident direction of the excitation light EL should be inclined at a predetermined angle with respect to a direction which is at right angles to the luminescent plate 101. Namely, the excitation light EL is incident obliquely on the shining sport S on the fluorescent light emitting zone 103 with respect to the front flat surface of the base material 102. Consequently, in relation to the incident direction of the excitation light EL, the excitation light EL may be shone onto the shining spot S on the fluorescent light emitting zone 103 from a center side of the luminescent wheel 101, which is the luminescent wheel. Alternatively, the excitation light EL may be shone onto the shining spot S on the fluorescent light emitting zone 103 from an outer circumferential side of the luminescent plate 101, which is the luminescent wheel. In any case, the excitation light EL should be incident on the shining spot S from a radial direction of the luminescent plate 101, which is the luminescent wheel.

As illustrated in FIG. 8B, fluorescent light FL having a wavelength in the green wavelength range is emitted from this shining spot, which is referred to as a light emitting point. The fluorescent light having a wavelength in the green wavelength rage is diffuse light, and its axis is offset radially outwards of the luminescent plate 101 with respect to the optical axis L1 of the collective lens 109a (the collective lens group 109).

As illustrated in FIG. 6, fluorescent light FL having a wavelength in the green wavelength range which is emitted from the green light source device 80 is reflected by the first zone 78a and the second zone 78b of the first divided dichroic mirror 78 and is then incident on the collective lens 146. In this case, too, the axis of the light having a wavelength in the green wavelength range which is reflected by the first divided dichroic mirror 78 deviates from the optical axis L2 of the collective lens 146. Consequently, the light having a wavelength in the green wavelength range which is reflected by the first divided dichroic mirror 78 and is then emitted from the collective lens 146 comes to match the third zone 148a of the second divided dichroic mirror 148 and is then incident on the third zone 148a.

As has been described above, light having a wavelength in the green wavelength range (fluorescent light FL) is fluorescently produced in the fluorescent light emitting zone 103 of the luminescent plate 101 as a result of excitation light EL being shone onto the green luminescent material of the fluorescent light emitting zone 103 at the shining spot S and is then emitted from the shining spot S. As this occurs, part of the excitation light EL is occasionally allowed to reach directly the base material 102 of the luminescent plate 101 without being shone onto the green luminescent material of the fluorescent light emitting zone 103 which is formed by packing granular luminescent materials solidly. Even in this case, although some of the excitation light EL which is reflected on the mirror finished surface of the base material 102 is shone onto the green luminescent material, part of the excitation light EL reflected by the mirror finished surface of the base material 102 is occasionally directly emitted from the collective lens group 109 without being shone onto the green luminescent material on the fluorescent light emitting zone 103.

In this way, even with the light having a wavelength in the green wavelength range into which the residual excitation light EL having a wavelength in the blue wavelength range is mixed, when the light having a wavelength in the green wavelength range matches the third zone 148a of the second divided dichroic mirror 148 and is then incident on the third zone 148a, the light having a wavelength in the green wavelength range is allowed to pass through but the residual excitation light EL, which is the light having a wavelength in the blue wavelength range, is reflected on the third zone 148a to be discarded, whereby light having a wavelength in the green wavelength range whose color purity is increased can be obtained.

Figure 8C:
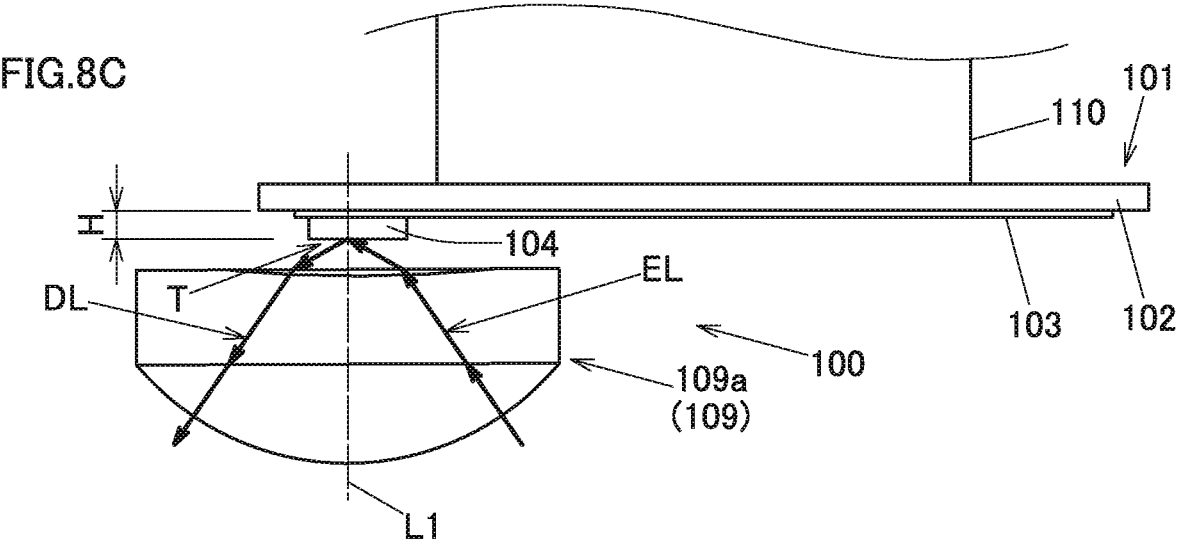
FIG. 8C is an enlarged schematic plan view of the periphery of a light shining spot of the luminescent plate device according to the first embodiment of the invention, illustrating a state in which light having a wavelength in the blue wavelength range is reflected by a reflecting member.

On the other hand, when light having a wavelength in the blue wavelength range is reflected on the diffuse reflection zone 104 of the luminescent plate 101, as illustrated in FIG. 8C, the diffuse reflection zone 104 is disposed in a position which matches the collective lens 109a. Then, light having a wavelength in the blue wavelength range which emerges from the collective lens 109a is shone onto a shining spot T on the diffuse reflection zone 104. The shining spot T on the diffuse reflection zone 104 is referred to as a reflection point of deflected light DL. A height of the shining spot T from the base material 102 is higher than that of the shining spot S on the fluorescent light emitting zone 103 (H>h), and light of the blue wavelength range (excitation light EL) is incident obliquely on the shining point T with respect to the optical axis L1 of the collective lens 109a. Thus, the reflection point, which is the shining spot T, is disposed on the optical axis L1 of the collective lens 109a and is disposed in a position lying closer to the collective lens 109a than the light emitting point, which is the shining spot S. Namely, a distance from the light emitting point of the fluorescent light emitting zone 103 to the collective lens 109a differs from a distance from the reflection point of the diffuse reflection zone (reflection zone) 104. In this way, when excitation light EL is incident from a radial direction of the luminescent plate 101, which is the luminescent wheel, the position where excitation light is shone onto the diffuse reflection zone 104 differs radially from the position where excitation light EL is shone onto the fluorescent light emitting zone 103.

As illustrated in FIG. 7, the light having a wavelength in the blue wavelength range which is reflected on the diffuse reflection zone 104 and emerges from the collective lens group 109 comes to match the second zone 78b of the first divided dichroic mirror 78 and is then incident on the second zone 78b. Consequently, the light having a wavelength in the blue wavelength range is reflected by the second zone 78b and is then incident on the collective lens 146. Then, the axis of the light having a wavelength in the blue wavelength range which is incident on the collective lens 146 is inclined at the predetermined angle with respect to the optical axis L2 of the collective lens 146. Consequently, the light having a wavelength in the blue wavelength range which emerges from the collective lens 146 comes to match the fourth zone 148b of the second divided dichroic mirror 148 and is then incident on the fourth zone 148b. Then, the light having a wavelength in the blue wavelength range passes through the fourth zone 148b of the second divided dichroic mirror 148 and is then incident on the collective lens 174 of the light source side optical system 170.

Since the refractive index of light having a wavelength in the blue wavelength range is higher than that of light having a wavelength in the green wavelength range, the reflection point of the shining spot T where light having a wavelength in the blue wavelength range which emerges from the collective lens group 109 is reflected is placed closer to the collective lens 109a than the light emitting point of the shining spot S where fluorescent light is emitted. However, the light emitting point of the shining spot S where fluorescent light is emitted can also be placed closer to the collective lens 109a.

Second Embodiment

Figure 9:
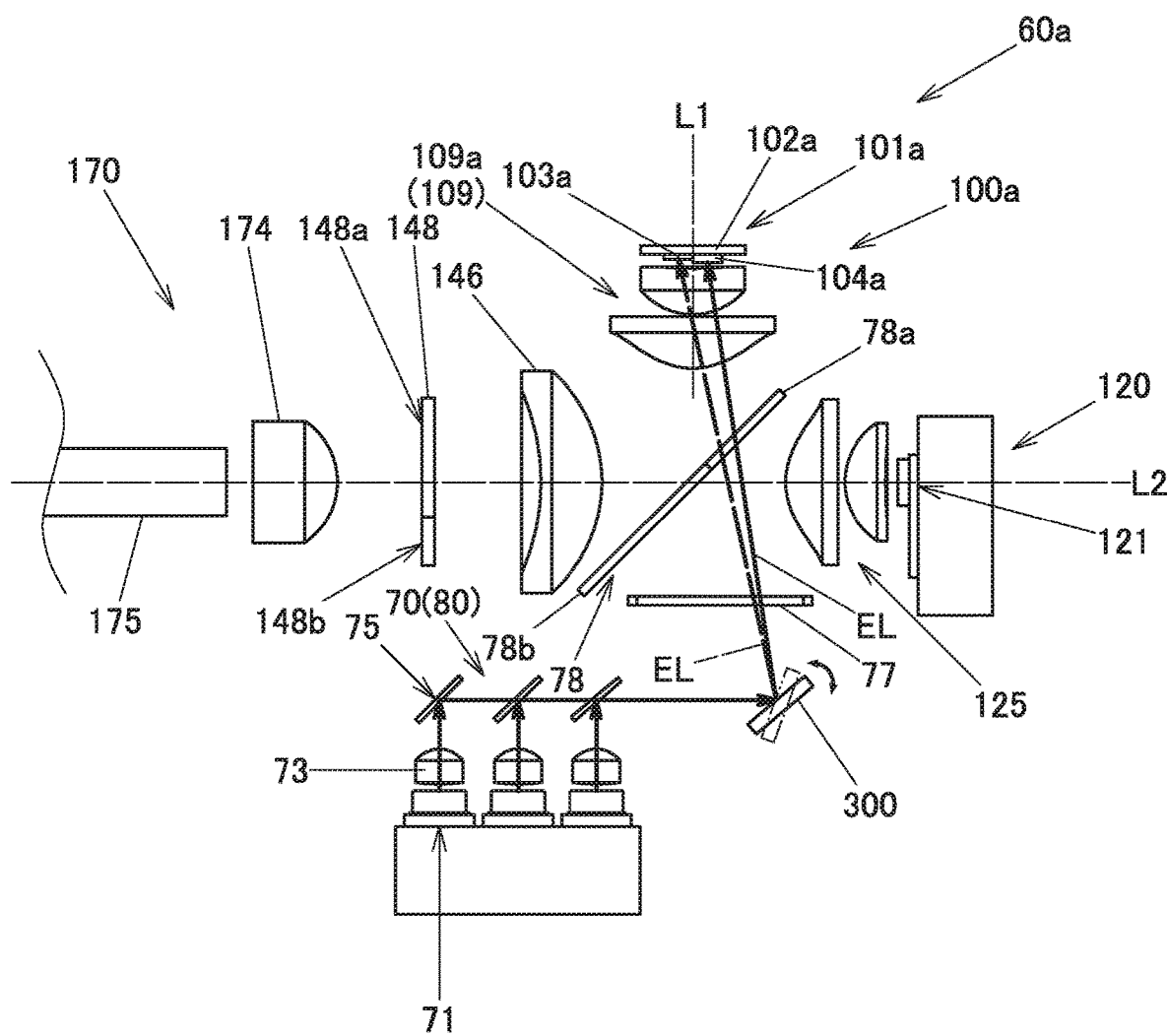
FIG. 9 is an enlarged schematic plan view of a light source unit according to a second embodiment of the invention, illustrating a state in which light having a wavelength in the blue wavelength range is emitted.

A light source unit 60a according to a second embodiment will be described by reference to FIGS. 9 to 11. A light source unit 60a illustrated in FIG. 9 is such that a Micro Electro Mechanical Systems (MEMS) mirror 300 is disposed on an optical path of light having a wavelength in the blue wavelength range which is emitted from the reflecting mirror 75 of the excitation light shining device 70 in the light source unit 60 of the first embodiment. In the light source unit 60a of the second embodiment, this MEMS mirror 300 functions as an optical path turning device configured to turn an optical path of light having a wavelength in the blue wavelength range emitted from a reflecting mirror 75 of an excitation light shining device 70. Additionally, the light source unit 60a of this embodiment includes a luminescent plate device 100a constituting a fixed luminescent material light source in place of the luminescent plate device 100 of the first embodiment. In the following description, like reference numerals will be given to like members and portions to those of the first embodiment, and the description of those like members and portions will be omitted or simplified.

The excitation light shining device 70 of this embodiment is disposed in such a way that light having a wavelength in the blue wavelength range which is reflected on the reflecting mirror 75 is parallel to light having a wavelength in the red wavelength range which is emitted from a red light source device 120. Then, the MEMS mirror 300 is disposed in such a way that the MEMS mirror 300 reflects light having a wavelength in the blue wavelength range which is reflected on the reflecting mirror 75 of the excitation light shining device 70 so that the reflected light having a wavelength in the blue wavelength range intersects light having a wavelength in the red wavelength range which is emitted from the red light source device 120. Consequently, light having a wavelength in the blue wavelength range which is emitted from the excitation light shining device 70 is reflected towards the luminescent plate device 100a.

The MEMS mirror 300 includes a reflecting mirror and a coil. The MEMS mirror 300 generates a Lorentz force when the coil is energized, whereby an angle is changed at which the mirror is disposed. Namely, in the MEMS mirror 300, the angle of the reflecting mirror of the MEMS mirror 300 is changed so as to switch a shining position onto which light having a wavelength in the blue wavelength range (excitation light EL) which is reflected by the reflecting mirror is shone between a fluorescent light emitting zone 103a and a diffuse reflection zone 104a.

Figure 10A:
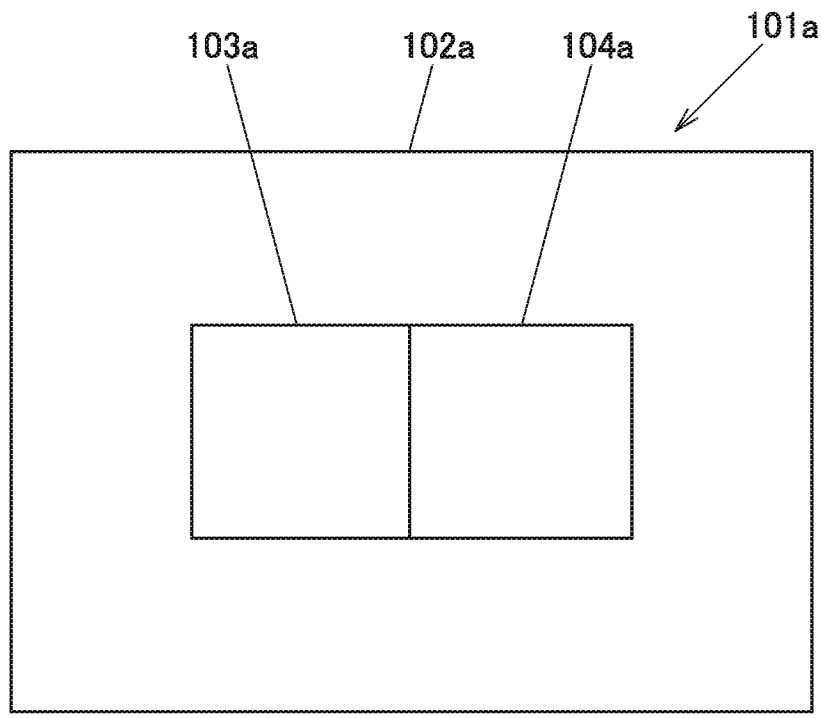
FIG. 10A is a schematic front view of a luminescent plate of the light source of the second embodiment of the invention.
Figure 10B:
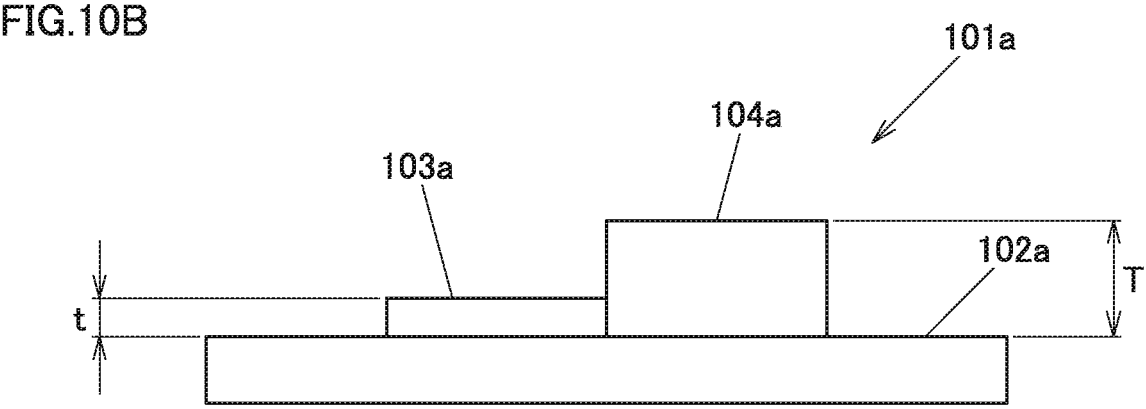
FIG. 10B is a schematic side view of the luminescent plate of the light source unit according to the second embodiment of the invention.

The luminescent plate device 100a includes a luminescent plate 101a which is disposed parallel to a left panel 15. As illustrated in FIG. 10, the luminescent plate 101a has a substantially rectangular shape. The luminescent plate 101a includes a base material 102 which functions as a light source fixing member and also includes the fluorescent light emitting zone 103a and the diffuse reflection zone 104a which are formed on the base material 102. The florescent light emitting zone 103a emits fluorescent light, and the diffuse reflection zone 104a reflects light having a wavelength in the blue wavelength range. FIG. 10A is a front view of the luminescent plate 101a as viewed from where the MEMS mirror 300 is provided. FIG. 10B is a side view of the luminescent plate 101a.

In the luminescent plate 101a, as illustrated in FIG. 10B, the diffuse reflection zone 104a is formed thicker than the fluorescent light emitting zone 103a. For example, the diffuse reflection zone 104a is formed as thick as T=about 0.3 mm on the base material 102a. Similar to the first embodiment, the diffuse reflection zone 104a is made up of a metallic reflecting member and a diffuse transmission portion formed on the reflecting member. The diffuse reflection zone 104a also includes a diffuse reflection member formed of glass, for example, and a reflection coat is applied to the diffuse reflection member. Minute irregularities are formed on a surface of the reflection coat. On the other hand, the fluorescent light emitting zone 103a laid out on the base material 102a is formed as thick as t=about 0.1 mm on the base material 102a. By adopting this configuration, in the luminescent plate 101a, the diffuse reflection zone 104a projects about 0.2 mm higher than the fluorescent light emitting zone 103a on the base material 102a. The fluorescent light emitting zone 103a and the diffuse reflection zone 104a each have a substantially square shape and are disposed contiguous to each other in a longitudinal direction while sharing a common boarder which is situated at a center of the base material 102a.

Figure 11A:
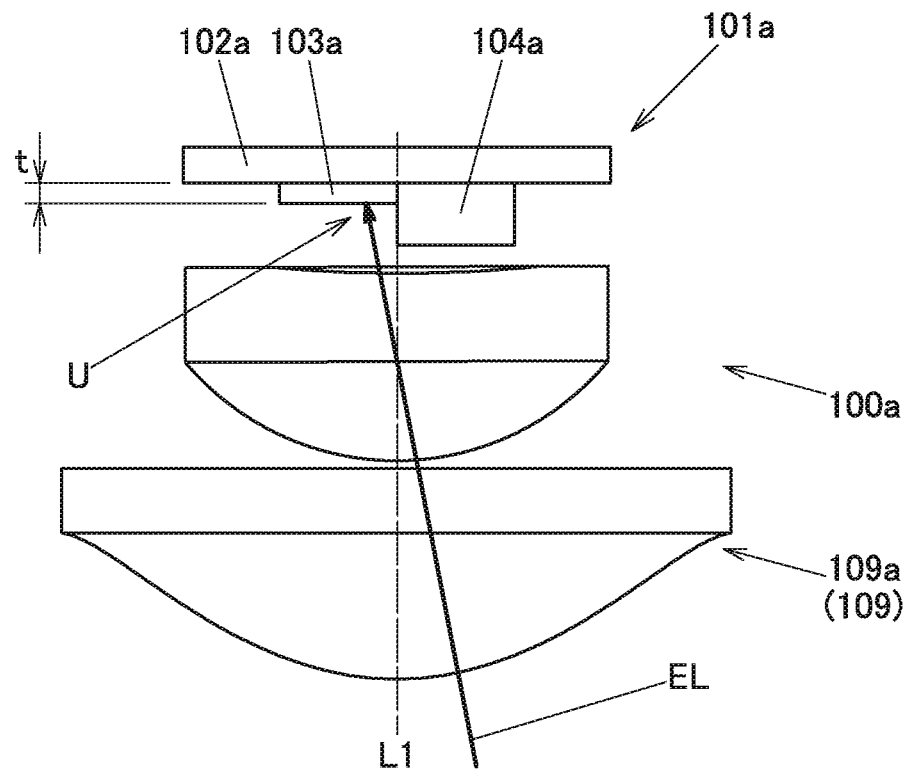
FIG. 11A is an enlarged schematic plan view of the periphery of a light shining spot of a luminescent plate device according to the second embodiment of the invention, illustrating a state in which light having a wavelength in the blue wavelength range is shone onto a fluorescent light emitting zone.

When a green light source device 80 emits light having a wavelength in the green wavelength range, as illustrated in FIGS. 9 and 11A, light having a wavelength in the blue wavelength range (excitation light EL) which is reflected by the MEMS mirror 300 is shone onto the fluorescent light emitting zone 103a which lies on a left side of a center (an optical axis L1) of a collective lens group 109. As this occurs, as illustrated in FIG. 11A, excitation light EL2, which is light having a wavelength in the blue wavelength, is collected to a shining spot U on the fluorescent light emitting zone 103a.

Figure 11B:
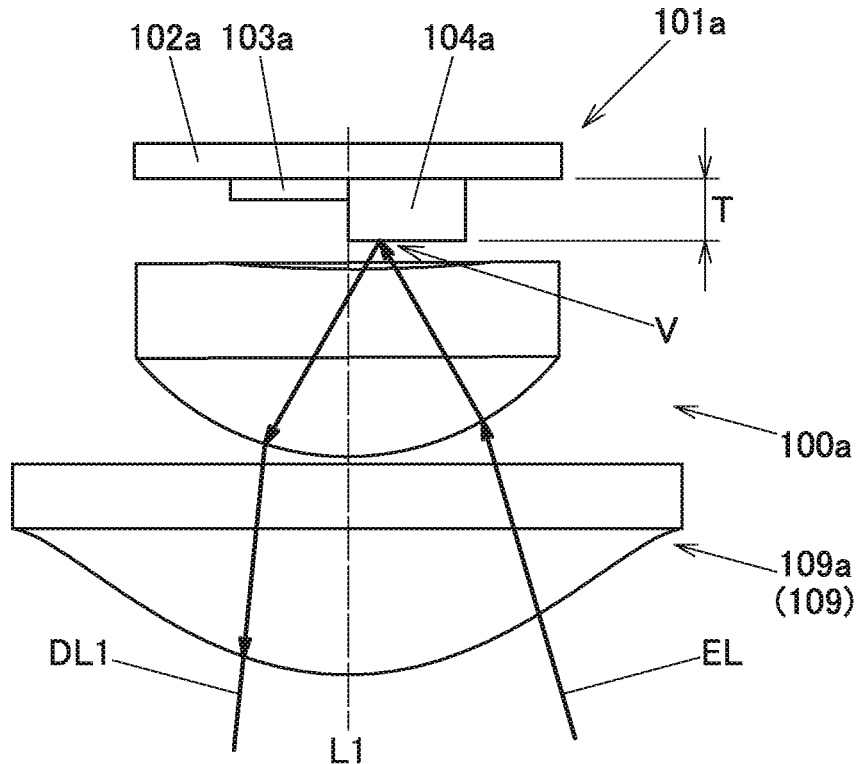
FIG. 11B is an enlarged schematic plan view of the periphery of a light shining spot of the luminescent plate device according to the second embodiment of the invention, illustrating a state in which light having a wavelength in the blue wavelength range is reflected by a diffuse reflection zone.

On the other hand, when the luminescent plate device 100a emits light having a wavelength in the blue wavelength range, as illustrated in FIG. 11B, light having a wavelength in the blue wavelength range EL3 (excitation light EL) which is reflected by the MEMS mirror 300 is shone onto the diffuse reflection zone 104a which lies on a right side (an opposite side to the fluorescent light emitting zone 103a across the optical axis L1 as the center) of a center (an optical axis L1) of the collective lens 109a on the figure. Then, light having a wavelength in the blue wavelength range (excitation light EL) which is emitted from the collective lens 109a is shone onto the diffuse reflection zone 104a at a shining spot V. This shining spot V on the diffuse reflection zone 104a is referred to as a shining spot V of a reflection point of reflected light DL1. Here, the position of the shining spot V on the diffuse reflection zone 104a is higher than the position of the shining spot U on the fluorescent light emitting zone 103a (T>t). Namely, since the diffuse reflection zone 104a projects more than the fluorescent light emitting zone 103a, there is produced a difference in level or step between them accordingly. This step serves to reduce a tilt angle at which the MEMS mirror 300 tilts its reflection mirror when the MEMS mirror 300 switches the path of reflected light between the fluorescent light emitting zone 103a and the diffuse reflection zone 104a.

An angle of the reflection mirror of the MEMS mirror 300 when reflected light from the MEMS mirror 300 is shone onto the diffuse reflection area 104a is referred to as a reference angle. An angle between incident light on and reflected light from the MEMS mirror 300 is referred to an optical tilt angle. Then, for example, when the MEMS mirror 300 tilts its reflection mirror through 4 degrees with respect to the reference angle, an optical tilt angle of light having a wave length in the blue wavelength range becomes 8 degrees at which the light in the blue wavelength range can be inclined.

In this way, with the light source unit 60a of the second embodiment, the MEMS mirror 300 can reflect light having a wavelength in the blue wavelength range which is emitted from the excitation light shining device 70 and switch the shining position of the reflected light between the fluorescent light emitting zone 103a and the diffuse reflection zone 104a.

Third Embodiment

Next, referring to FIGS. 12A to 12C, a light source unit 60b according to a third embodiment of the invention will be described. The light source unit 60b illustrated in FIG. 12A includes a reflection wheel 400 in place of the MEMS mirror 300 of the second embodiment. This reflection wheel 400 functions as an optical path turning device configured to turn an optical path of light emitted from an excitation light shining device 70. Additionally, the reflection wheel 400 includes a motor 440. Like reference numerals will be given to like members and portions to those of the first or second embodiment, and the description of those members and portions will be omitted or simplified here.

As illustrated in FIGS. 12A to 12C, the reflection wheel 400 includes a first reflection plate 420 and a second reflection plate 430 which are provided on a circular disc-shaped base plate 410. The first reflection plate 420 has an arc-like shape when seen from front and is given a predetermined first angle, and the second reflection plate 430 has an arc-like shape when seen from front and is given a predetermined second angle. In other words, since the reflection wheel 400 is disposed inclined with respect to an axis of light emitted from the excitation light shining device 70, the reflection wheel 400 includes the first reflection plate 420 configured to reflect excitation light at a reference angle (the first angle) and the second reflection plate 430 configured to reflect excitation light at an angle inclined further through a predetermined angle from the reference angle (the second angle). The first reflection plate 420 given the first angle reflects light having a wavelength in the blue wavelength range (excitation light EL) which is emitted from a reflection mirror 75 of the excitation light shining device 70 (refer to FIG. 11B) and causes the excitation light EL to be incident on a collective lens group 109 of a luminescent plate device 100a at the reference angle. The light having a wavelength in the blue wavelength range (the excitation light EL) which is reflected on the first reflection plate 420 illuminates a diffuse reflection area 104a.

On the other hand, the second reflection plate 430 given the second angle has a reflecting surface which is formed inclined and reflects excitation light emitted from the excitation light shining device 70 at the second angle inclined further through the predetermined angle from the reference angle (FIGS. 12A to 12C). Then, the excitation light EL reflected at the second reflection plate 430 illuminates a fluorescent light emitting zone 103a.

In the reflection wheel 400 of this embodiment, the base plate 410 is rotated by the motor 440, and excitation light EL is reflected by the first reflection plate 420 and the second reflection plate 430, whereby the shining position of excitation light EL is switched between them.

Fourth Embodiment

Next, referring to FIGS. 13A to 13C, a light source unit 60c according to a fourth embodiment of the invention will be described. In the light source unit 60c illustrated in FIG. 13A, a luminescent plate device 100b including a wheel motor 110a is provided in place of the luminescent plate device 100a of the light source unit 60a illustrated in the second embodiment. In the following description, like reference numerals will be given to like members and portions to those of the second embodiment, and the description of the members and portions will be omitted or simplified.

Figure 13A:
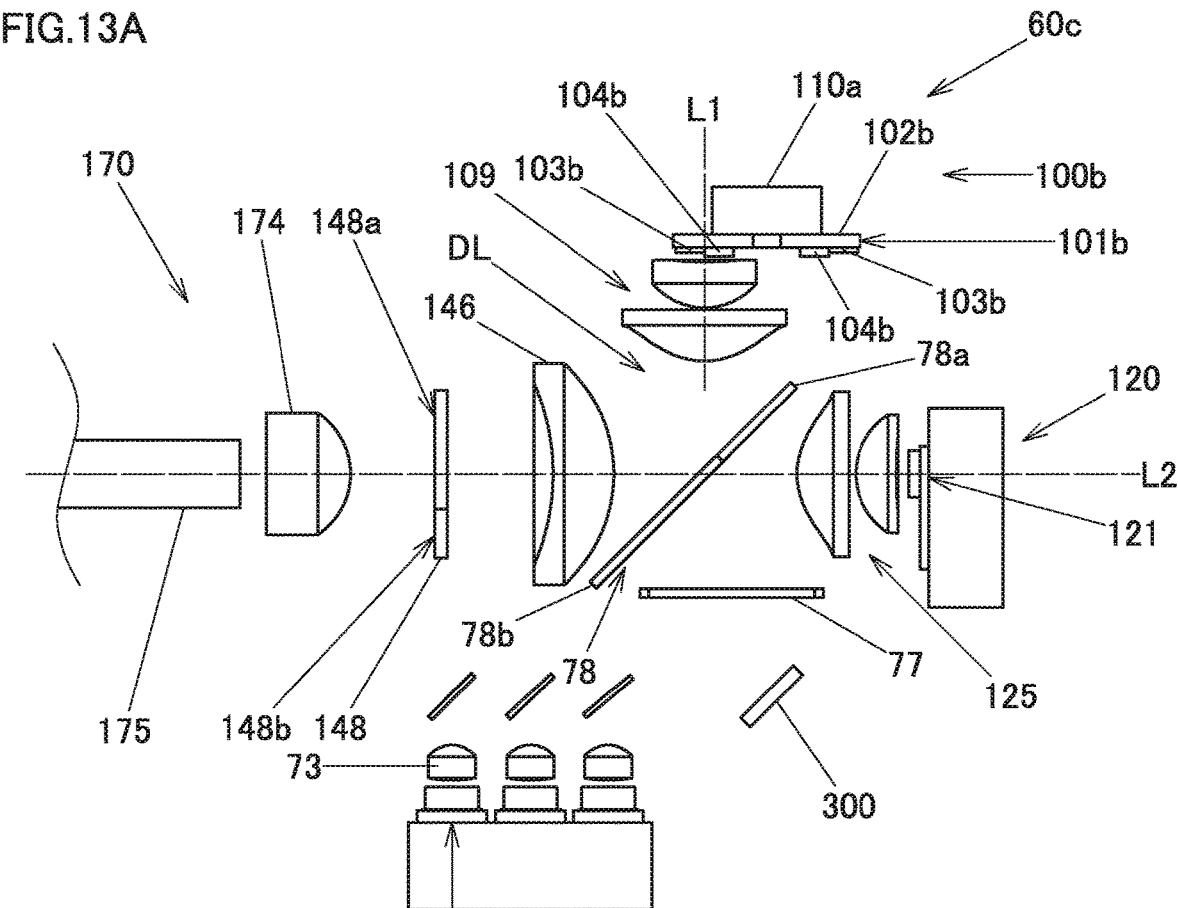
FIG. 13A is of a light source unit according to a fourth embodiment of the invention, illustrating a state in which excitation light is shone onto a fluorescent light emitting zone.
Figure 13B:
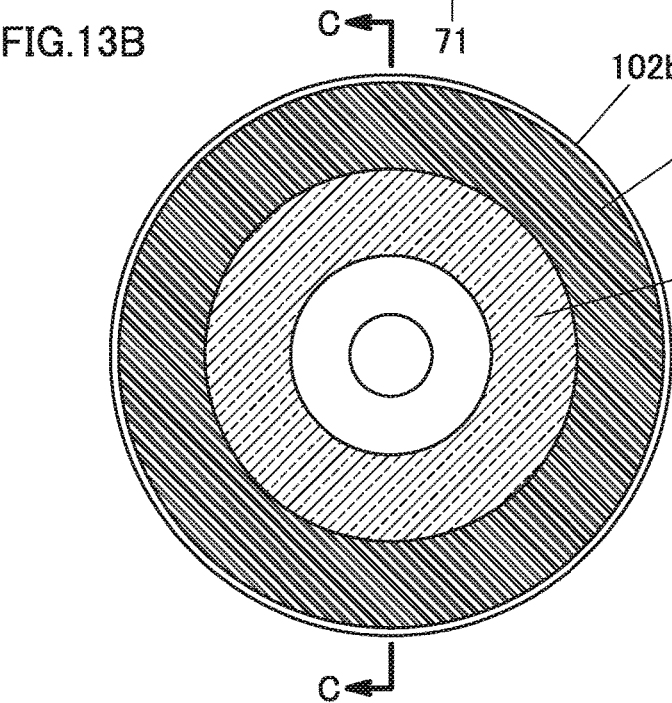
FIG. 13B is a schematic front view of a luminescent plate of the light source unit according to the fourth embodiment of the invention.
Figure 13C:
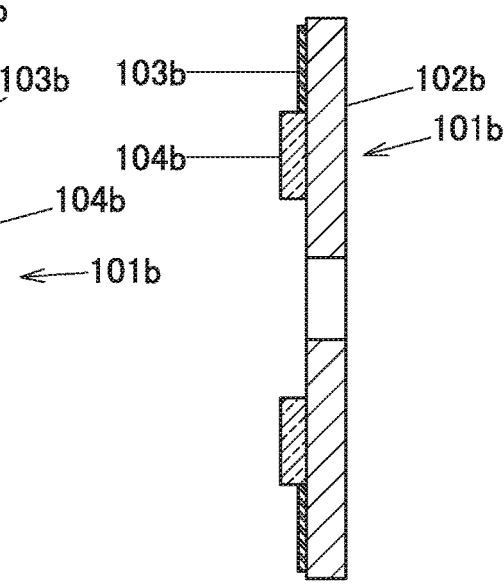
FIG. 13C is a schematic sectional view of the luminescent plate of the light source unit according to the fourth embodiment of the invention, taken along a line C-C in FIG. 13B

As illustrated in FIGS. 13A to 13C, the luminescent plate device 100b of the light source unit 60c includes a luminescent plate 101b which is configured as a luminescent wheel. The luminescent plate 101b includes a base material 102b, a fluorescent light emitting zone 103b and a diffuse reflection zone 104b which are formed on one surface of the base material 102b.

The luminescent plate device 100b includes the wheel motor 110a and rotates the luminescent plate 101b, which is the luminescent wheel, by using the wheel motor 110a. By adopting this configuration, in this embodiment, heat can be prevented from being concentrated to the luminescent plate 101b. Additionally, since the diffuse reflection zone 104b also rotates as the luminescent plate 101b rotates, speckle noise can be reduced.

Thus, according to the embodiments of the invention that have been described heretofore, the light source unit 60 (60a to 60c) has the excitation light shining device 70 including the blue laser diodes 71 (the excitation light sources) which emit light having a wavelength in the blue wavelength range (excitation light), the collective lens 109a (the collective lens group 109) disposed on the optical path of light emitted from the blue laser diodes 71, the fluorescent light emitting zone 103 (the fluorescent light emitting zone) which emits fluorescent light, and the diffuse reflection zone 104 which is the reflection member configured to reflect excitation light. Further, in the luminescent plate 101 including the base material 102, the fluorescent light emitting zone 103 formed on the one surface of the base material 102 and configured to emit fluorescent light FL having a wavelength in the different wavelength range from that of the excitation light EL and the diffuse reflection zone (the reflection zone) disposed so as to be aligned with the fluorescent light emitting zone 103 on the one surface of the base material 102 and configured to reflect the excitation light EL, the height from the base material 102 to the surface of the fluorescent light emitting zone 103 and the height from the base material 102 to the surface of the diffuse reflection zone (the reflection zone) 104 differ from each other.

By adopting this configuration, the axis of light having a wavelength in the blue wavelength range and the axis of light having a wavelength in the green wavelength range which are both emitted from the collective lens group 109 can be offset from each other. Therefore, the filter member (the second divided dichroic mirror in the first embodiment) including the color filtering function for light having a wavelength in the blue wavelength range and light having a wavelength in the green wavelength range can be disposed on the optical paths of the light having a wavelength in the blue and green wavelength ranges. Consequently, compared with a case where light having a wavelength in the blue wavelength range and light having a wavelength in the green wavelength range are guided into the same light axis, the necessity of a filter device including a driving mechanism such as a wheel motor can be obviated, and therefore, the light source unit can be provided which is formed small in size.

In addition, excitation light is incident obliquely on the one surface of the base material 102. This can cause the position of the shining spot S to deviate from the optical axis L1.

The reflection point is disposed closer to the collective lens group 109 (the collective lens 109a) than the fluorescent light emitting zone 103. By doing so, light having a wavelength in the blue wavelength range whose refractive index is high can be collected to the collective lens 109a efficiently.

Either of the light emitting point of the fluorescent light emitting zone 103 and the reflection point of the diffuse reflection area 104 is disposed so as to be offset from the optical axis of the collective lens group 109. This enables the other of the light emitting point of the fluorescent light emitting zone 103 and the reflection point of the diffuse reflection zone 104 can be disposed on the optical axis of the collective lens group 109, whereby design of layout of the optical members downstream of the luminescent plate 101 can be facilitated.

The light source unit 60 includes the luminescent plate 101 including, in turn, the fluorescent light emitting zone 103 and the diffuse reflection zone 104. Then, the height H of the diffuse reflection zone 104 from the base material 102 is higher than the height h of the fluorescent light emitting zone 103 from the base material 102. In this way, light having a wavelength in the blue wavelength range whose refractive index is high can be collected efficiently by moving the reflection point of the diffuse reflection zone 104 towards the collective lens 109a.

Either of the light emitting point of the fluorescent light emitting zone 103 and the reflection point of the diffuse reflection zone is disposed on the optical axis of the collective lens group 109. Since this enables reflected light to be emitted which is symmetrical with light having a wavelength in the blue wavelength range which is incident on the collective lens group 109 with respect to the optical axis, the design of layout of the optical members downstream of the luminescent plate 101 can be facilitated.

The diffuse reflection zone 104 includes the metallic reflection member which is formed on the surface or in the cut-away through hole portion in the base material 102 and the diffuse transmission portion which is formed on the reflection member. This can reflect light incident on the diffuse reflection zone 104 as diffuse light.

The first divided dichroic mirror 78 is provided on the optical path between the blue laser diodes 71 and the fluorescent light emitting zone 103. The first divided dichroic mirror 78 includes the first zone 78a and the second zone 78b. The first zone 78a transmits light having a wavelength in the blue wavelength range and reflects light having a wavelength in the green wavelength range. The second zone 78b reflects light having a wavelength in the blue wavelength range and light having a wavelength in the green wavelength range. Then, light having a wavelength in the blue wavelength range which is emitted from the blue laser diodes 71 comes to match the first zone 78a and is then incident on the first zone 78a, while light having a wavelength in the blue wavelength range which is reflected by the diffuse reflection zone 104 comes to match the second zone 78b and is then incident on the second zone 78b. By adopting this configuration, light having a wavelength in the blue wavelength range can be reflected towards the light guiding optical system 140 while causing light having a wavelength in the blue wavelength range to be incident on the collective lens group 109 by way of the first divided dichroic mirror 78.

The second divided dichroic mirror 148 is provided on the optical axes of light having a wavelength in the blue wavelength range and light having a wavelength in the green wavelength range which are both reflected by the first divided dichroic mirror 78. The second divided dichroic mirror 148 includes the third zone 148a and the fourth zone 148b. The third zone 148a reflects light having a wavelength in the blue wavelength range and transmits light having a wavelength in the green wavelength range. The fourth zone 148b transmits light. Then, light having a wavelength in the blue wavelength range which is reflected by the first divided dichroic mirror 78 comes to match the fourth zone 148b and is then incident on the fourth zone 148b. Light having a wavelength in the green wavelength range which is reflected by the first divided dichroic mirror 78 comes to match the third zone 148a and is then incident on the third zone 148a. This enables the second divided dichroic mirror 148 which is small in size to be adopted, thereby making it possible to obtain the light source unit 60 which can enhance the color purity of green.

The light source unit 60 includes the red light source 121 (the third light source) which emits light having a wavelength in the red wavelength range (light having a wavelength in the third wavelength range). The red light source 121 is disposed in such a way that light emitted from the red light source 121 intersects light emitted from the blue laser diodes 71 and light emitted from the fluorescent light emitting zone 103 and is then incident on the first divided dichroic mirror 78. By adopting this configuration, the light source unit 60 can be provided which has the blue, green and red light sources while being formed small in size.

The first zone 78a and the second zone 78b of the first divided dichroic mirror 78 and the third zone 148a of the second divided dichroic mirror 148 transmit light having a wavelength in the red wavelength range. By adopting this configuration, light having a wavelength in the red wavelength range can easily be added to the configuration in which the residual excitation light of light having a wavelength in the green wavelength range is removed.

The light source unit 60a can include the optical path turning device which reflects excitation light EL2 emitted from the excitation light shining device 70 to shine it onto the luminescent plate 101a. This enables the optical path turning device to switch the shining position of the reflected excitation light between the fluorescent light emitting zone 103a and the diffuse reflection zone 104a.

The light source unit 60a includes the MEMS mirror 300 which functions as the optical path turning device. The MEMS mirror 300 switches the shining position of excitation light EL2 between the fluorescent light emitting zone 103a and the diffuse reflection zone 104a. Since the MEMS mirror 300 includes the mirror configured to change the shining angle at which excitation light is shone onto the luminescent plate 101a, the MEMS mirror 300 can switch the shining position onto which excitation light is shone by changing the shining angle.

Consequently, the light source 60a can be reduced into a smaller size than that of the light source unit 60 of the first embodiment by realizing the luminescent plate device 100a which is configured as the fixed luminescent light source. Color aberration can be suppressed by switching the shining angle of the MEMS mirror 300 in synchronism with the operation of the display device 51, which is the DMD. This can not only obtain a clear and highly accurate image but also enhance the light collecting efficiency.

The light source unit 60b includes the reflection wheel 400, which functions as the optical path turning device, configured to reflect excitation light EL2 emitted from the excitation light shining device 70 to shine it towards the luminescent plate 101a. The luminescent wheel 400 includes the base plate 410 having the first reflection plate 420 given the predetermined first angle at which excitation light is shone onto the diffuse reflection zone 104a and the second reflection plate 430 given the second predetermined angle at which excitation light is shone onto the fluorescent light emitting zone 103a. In the reflection wheel 400, the base plate 410 is rotated by the motor 440, so that excitation light EL is reflected on the first reflection plate 420 and the second reflection plate 430, whereby the shining positions of excitation light are switched.

By doing this configuration, since the reflection wheel 400 can easily switch the shining position of excitation light EL between the fluorescent light emitting zone 103a and the diffuse reflection zone 104a, the light source 60b of this embodiment can be made smaller in size than the light source unit 60 of the first embodiment. In addition, compared with the case where the MEMS mirror 300 described in the second embodiment is used, since light having a wavelength in the blue wavelength range which is emitted from the excitation light shining device 70 can be dispersed more, the thermal load can be reduced.

The base material 102a is formed of the light source fixing member. This obviates the necessity of using the wheel motor 110 of the first embodiment, and therefore, not only can the light source unit 60a be made smaller in size, but also noise can be reduced further.

The luminescent plate device 100b includes further the wheel motor 110a, and this wheel motor 110a rotates the fluorescent light emitting zone 103a and the diffuse reflection zone 104a. This can avoid a risk of heat being concentrated to the luminescent plate 101b. Additionally, speckle noise can be reduced as a result of the diffuse reflection zone 104b rotating as the luminescent plate 101b rotates.

The projector 10 includes the light source unit 60 in which the light emitting point on the fluorescent light emitting zone 103 differs in position from the reflection point on the diffuse reflection zone 104, the display device 51 onto which light source light from the light source unit 60 is shone to form image light, the projection optical system 220 which projects the image light emitted from the display device 51 onto the screen, and the projector control unit configured to control the display device 51 and the light source unit 60. By adopting this configuration, the projector can be provided which includes the filter members to enhance the color purity to thereby be able to project the clear image onto the screen.

In the second to fourth embodiments, the diffuse reflection zone 104a, 104b of the luminescent plate 101a, 101b projects more than the fluorescent light emitting area 103a, 103b to thereby have the difference in level or step. However, the invention is not limited to this configuration. Hence, the shining position of excitation light on the fluorescent light emitting zone 103a, 103b and the shining position of excitation light on the diffuse reflection zone 104a, 104b should differ from each other radially of the luminescent wheel. Namely, the distance from the center of the luminescent wheel to the shining position of excitation light on the fluorescent light emitting zone 103a, 103b should differ from the distance from the center of the luminescent wheel to the shining position of excitation light on the diffuse reflection zone 104a, 104b.

In the second to fourth embodiments, since the incident angle of excitation light is changed by using the MEMS mirror 300 or the reflection wheel 400, even though the difference in level or step is not provided between the diffuse reflection zone 104a, 104b and the fluorescent light emitting zone 103a, 103b, the state where excitation light is incident on the diffuse reflection zone 104, 104b and the state where excitation light is incident on the fluorescent light emitting zone 103a, 103b can be switched with good efficiency.

While the embodiments of the invention have been described heretofore, the embodiments are presented as examples, and hence, there is no intention to limit the scope of the invention by the embodiments. These novel embodiments can be carried out in other various forms, and various omissions, replacements and modifications can be made to the embodiments without departing from the spirit and scope of the invention. Those resulting embodiments and their modifications are included in the spirit and scope of the invention and are also included in the scope of inventions claimed for patent under claims below and their equivalents.

What is claimed is:
1. A light source unit comprising:
an excitation light source configured to emit excitation light;
a luminescent wheel comprising a base material, a fluorescent light emitting zone formed on one surface of the base material and configured to emit fluorescent light having a wavelength in a wavelength range which differs from that of the excitation light and a reflection zone disposed so as to be aligned with the fluorescent light emitting zone on the one side surface of the base material and configured to reflect the excitation light; and a first divided dichroic mirror comprising a first zone configured to transmit the excitation light but reflect the fluorescent light and a second zone configured to reflect the excitation light and the fluorescent light, wherein the reflection zone comprises a reflection member containing a metal and formed on a surface or in a cut-away through hole in the base material and a diffuse transmission portion formed on the reflection member, and wherein the excitation light emitted from the excitation light source matches the first zone and is then incident on the first zone, and the excitation light reflected by the reflection member matches the second zone and is then incident on the second zone.

2. The light source unit according to claim 1, comprising: a second divided dichroic mirror comprising a third zone provided on an optical path of the excitation light and the fluorescent light which are reflected by the first divided dichroic mirror and configured to reflect the excitation light but transmit the fluorescent light a fourth zone configured to transmit light, wherein the excitation light reflected by the first divided dichroic mirror matches the fourth zone and is then incident on the fourth zone, and the fluorescent light reflected by the first divided dichroic mirror matches the third zone and is then incident on the third zone.

3. The light source unit according to claim 2, comprising:
a third light source configured to emit light having a wavelength in a third wavelength range which differs from the excitation light and the fluorescent light,
wherein the third light source is disposed so that light emitted from the third light source intersects the excitation light emitted from the excitation light source and the fluorescent light emitted from the fluorescent light emitting zone and is then incident on the first divided dichroic mirror.

4. The light source unit according to claim 3,
wherein the first zone and the second zone of the first divided dichroic mirror and the third zone of the second divided dichroic mirror transmit the light having a wavelength in the third wavelength range.

5. The light source unit according to claim 3,
wherein the excitation light is light having a wavelength in the blue wavelength range,
wherein the fluorescent light is light having a wavelength in the green wavelength range, and
wherein the light having a wavelength in the third wavelength range is light having a wavelength in the red wavelength range.

6. The light source unit according to claim 1, comprising:
an optical path turning device configured to reflect excitation light emitted from the excitation light source to shine the excitation light towards the luminescent wheel, and wherein the optical path turning device switches a shining position of the reflected excitation light between the fluorescent light emitting zone and the reflection zone.

7. The light source unit according to claim 6,
wherein the optical path turning device comprises a mirror configured to reflect the excitation light towards the luminescent wheel, and
wherein the mirror changes an angle at which the excitation is reflected to switch the shining positions of the excitation light.

8. The light source unit according to claim 6,
wherein the optical path turning device comprises a base plate including a first reflection plate having a predetermined first angle at which the reflection zone is illuminated and a second reflection plate having a second predetermined angle at which the fluorescent light emitting zone is illuminated, and
wherein the shining position of the excitation light is switched by rotating the base plate.

9. The light source unit according to claim 6,
wherein the base material is formed of a fixed light source member.

10. The light source unit according to claim 6, comprising further:
a wheel motor,
wherein the wheel motor rotates the luminescent wheel.

11. A projector comprising:
the light source unit according to claim 1;
a display device onto which light source light from the light source unit is shone to form image light;
a projection optical system configured to project the image light emitted from the display device onto a screen; and
a projector control unit configured to control the display device and the light source unit.

12. The light source unit according to claim 1,
wherein a height from the one surface of the base material to a surface of the fluorescent light emitting zone differs from a height from the one surface of the base material to a surface of the reflection zone.

13. The light source unit according to claim 1,
wherein the excitation light is incident obliquely on the one surface of the base material.

* * * * *

UNITED STATES PATENT AND TRADEMARK OFFICE
CERTIFICATE OF CORRECTION

| | |
|---|---|
| PATENT NO. | : 11,067,880 B2 |
| APPLICATION NO. | : 16/150054 |
| DATED | : July 20, 2021 |
| INVENTOR(S) | : Takeshi Miyazaki |

It is certified that error appears in the above-identified patent and that said Letters Patent is hereby corrected as shown below:

In the Claims

Claim 2, Column 21, Line 23, after "light" insert -- , and comprising --

Signed and Sealed this
Tenth Day of May, 2022

Katherine Kelly Vidal
*Director of the United States Patent and Trademark Office*